(12) United States Patent
Kwon et al.

(10) Patent No.: US 11,244,139 B2
(45) Date of Patent: Feb. 8, 2022

(54) FINGERPRINT RECOGNITION INTEGRATED CIRCUIT AND FINGERPRINT RECOGNITION DEVICE INCLUDING THE SAME

(71) Applicant: SAMSUNG ELECTRONICS CO., LTD., Suwon-si (KR)

(72) Inventors: Yong Il Kwon, Suwon-si (KR); Min Gyu Kim, Seongnam-si (KR); Sun Kwon Kim, Yongin-si (KR); Seong Il Park, Hwaseong-si (KR); Jong Sung Lee, Suwon-si (KR); Hee Bum Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 16/534,574

(22) Filed: Aug. 7, 2019

(65) Prior Publication Data

US 2020/0218870 A1 Jul. 9, 2020

(30) Foreign Application Priority Data

Jan. 7, 2019 (KR) .......................... 10-2019-0001564

(51) Int. Cl.
*G06K 9/00* (2006.01)
*G06F 21/32* (2013.01)
*G06F 3/041* (2006.01)

(52) U.S. Cl.
CPC .......... *G06K 9/0004* (2013.01); *G06F 21/32* (2013.01); *G06F 3/041* (2013.01)

(58) Field of Classification Search
None
See application file for complete search history.

(56) References Cited

U.S. PATENT DOCUMENTS 9,152,839 B2 10/2015 Yi et al.
9,311,519 B2 4/2016 Lee
2004/0021787 A1* 2/2004 Cho ........................ H04N 5/335
348/308

(Continued)

FOREIGN PATENT DOCUMENTS

KR 10-1054314 7/2011

*Primary Examiner* — Benjamin X Casarez
(74) *Attorney, Agent, or Firm* — F. Chau & Associates, LLC

(57) ABSTRACT

A fingerprint recognition device includes a display, a touch sensor panel (TSP) which senses a touch, and a fingerprint recognition integrated circuit (FPIC) which scans a fingerprint. The FPIC includes a pixel including a photoelectric element which receives light reflected by the fingerprint, a low noise amplifier (LNA) which outputs a signal voltage by converting an electric charge received from the photoelectric element, and an analog-to-digital converter (ADC) which converts the signal voltage into a digital signal. The ADC includes a variable reference voltage generator which provides a variable reference voltage, a comparator which adds the variable reference voltage to the signal voltage, performs correlated double sampling on the result of the addition, and outputs a comparison signal by comparing the result of the correlated double sampling with a ramp voltage, and a counter which outputs the digital signal by counting the comparison signal.

20 Claims, 22 Drawing Sheets

(56) References Cited

U.S. PATENT DOCUMENTS

| | | | |
|---|---|---|---|
| 2006/0001750 A1* | 1/2006 | Mizuguchi | H03M 1/0607 |
| | | | 348/294 |
| 2014/0146210 A1* | 5/2014 | Lee | H04N 5/378 |
| | | | 348/302 |
| 2014/0333328 A1 | 11/2014 | Nelson et al. | |
| 2016/0006969 A1* | 1/2016 | Matsumoto | H04N 5/357 |
| | | | 348/308 |
| 2016/0110581 A1 | 4/2016 | Heo et al. | |
| 2017/0205958 A1* | 7/2017 | Kurasawa | G06F 3/04164 |
| 2017/0270333 A1* | 9/2017 | Jeon | G06K 9/001 |
| 2017/0279948 A1* | 9/2017 | Hong | H04M 1/673 |
| 2017/0300736 A1* | 10/2017 | Song | G06K 9/0004 |
| 2018/0052558 A1 | 2/2018 | Wang et al. | |
| 2018/0284512 A1* | 10/2018 | Lee | G06F 1/1686 |
| 2019/0373195 A1* | 12/2019 | Minagawa | H04N 5/3745 |
| 2020/0005701 A1* | 1/2020 | Chen | G09G 3/2092 |
| 2020/0210673 A1* | 7/2020 | Krah | G06K 9/0004 |
| 2020/0250391 A1* | 8/2020 | Cao | G06F 3/041661 |
| 2021/0042403 A1* | 2/2021 | Zhou | G06K 9/00355 |

* cited by examiner

| P(0,0) | P(0,1) | ... | P(0,m) | ---H1 |
|--------|--------|-----|--------|-------|
| P(1,0) | P(1,1) | ... | P(1,m) | ---H2 |
| P(2,0) | P(2,1) | ... | P(2,m) | ---H3 |
| ⋮ | ⋮ | ... | ⋮ | ⋮ |
| P(n,0) | P(n,1) | ... | P(n,m) | ---Hn |

120

FINGERPRINT RECOGNITION INTEGRATED CIRCUIT AND FINGERPRINT RECOGNITION DEVICE INCLUDING THE SAME

CROSS-REFERENCE TO RELATED APPLICATIONS

This application claims priority under 35 U.S.C. § 119 to Korean Patent Application No. 10-2019-0001564, filed on Jan. 7, 2019 in the Korean Intellectual Property Office, the disclosure of which is incorporated by reference herein in its entirety.

TECHNICAL FIELD

Exemplary embodiments of the present inventive concept relate to a fingerprint recognition integrated circuit (FPIC) and a fingerprint recognition device including the same.

DISCUSSION OF THE RELATED ART

As fingerprint recognition devices are used more frequently in mobile devices, rapid technological developments are being made. A fingerprint recognition device, that is, a fingerprint sensor, was typically initially applied to a physical home button in mobile devices. However, with the recent tendency to minimize outer bezels, which may result in the need to remove the physical home button, methods of applying a fingerprint sensor to a display are being researched.

The methods of applying a fingerprint sensor to a display largely include capacitive, optical, and ultrasonic methods. The capacitive method has a poor sensing distance characteristic, and thus, problems may arise when using the capacitive method on a display. The ultrasonic method has drawbacks of high sensor cost and large computing power. The optical method is vulnerable to dry or low-temperature environments, but has advantages over other methods in terms of sensing distance and cost.

SUMMARY

Exemplary embodiments provide a fingerprint recognition device with reduced internal complexity and high resolution.

Exemplary embodiments also provide a fingerprint recognition integrated circuit (FPIC) with reduced internal complexity and high resolution.

According to an exemplary embodiment of the present inventive concept, a fingerprint recognition device includes a display which outputs an image, a touch sensor panel (TSP) which senses a touch on the display, and a fingerprint recognition integrated circuit (FPIC) which scans a fingerprint touched on the display. The FPIC includes a pixel including a photoelectric element for receiving light reflected by the fingerprint, a low noise amplifier (LNA) which outputs a signal voltage by converting an electric charge received from the photoelectric element, and an analog-to-digital converter (ADC) which converts the signal voltage into a digital signal. The ADC includes a variable reference voltage generator which provides a variable reference voltage, a comparator which adds the variable reference voltage to the signal voltage, performs correlated double sampling on the result of the addition, and outputs a comparison signal by comparing the result of the correlated double sampling with a ramp voltage, and a counter which outputs the digital signal by counting the comparison signal.

According to an exemplary embodiment of the present inventive concept, a fingerprint recognition device includes a display which outputs an image, a TSP which senses a touch on the display and generates touch coordinates, a display drive integrated circuit (DDI) which illuminates a scan area of the display determined based on the touch coordinates, an FPIC which generates fingerprint image data by scanning a fingerprint in the scan area, and a processor which receives the fingerprint image data.

According to an exemplary embodiment of the present inventive concept, an FPIC includes a sensor which includes a pixel array including a photoelectric element which receives light reflected by a fingerprint, and a read-out integrated circuit (IC) which processes an output of the sensor. The read-out IC includes a plurality of analog front ends (AFEs) connected to each of output lines respectively corresponding to columns of the pixel array. At least one of the AFEs includes a low noise amplifier (LNA) which outputs a signal voltage by converting an electric charge received through an output line, a low pass filter (LPF) which removes high-frequency noise of the signal voltage, and an analog-to-digital converter (ADC) which converts the signal voltage into a digital signal. The ADC includes a variable reference voltage generator which provides a variable reference voltage, a comparator which adds the variable reference voltage to the signal voltage, performs correlated double sampling on the result of the addition, and outputs a comparison signal by comparing the result of the correlated double sampling with a ramp voltage, and a counter which outputs the digital signal by counting the comparison signal.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION

Figure 1:
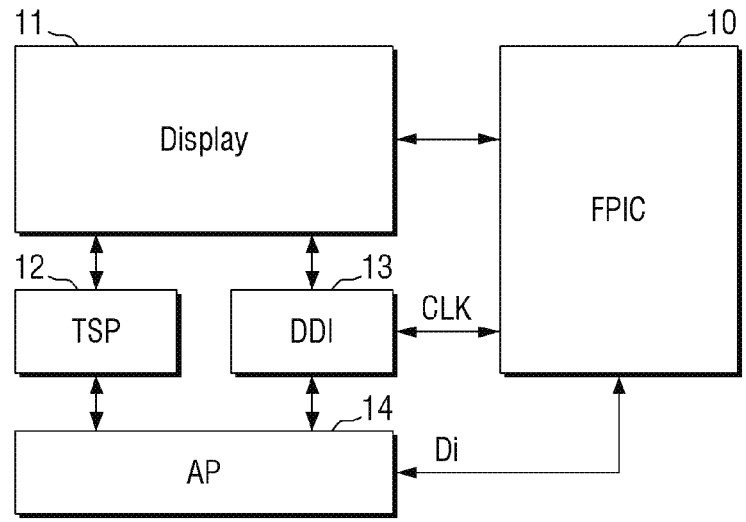
FIG. 1 is a block diagram of a fingerprint recognition device according to exemplary embodiments.

Exemplary embodiments of the present inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

A fingerprint recognition device according to exemplary embodiments will now be described with reference to FIG. 1.

FIG. 1 is a block diagram of a fingerprint recognition device according to exemplary embodiments.

Referring to FIG. 1, the fingerprint recognition device according to exemplary embodiments includes a display 11, a fingerprint recognition integrated circuit (FPIC) 10, a touch sensor panel (TSP) 12, a display drive integrated circuit (IC) (DDI) 13, and a processor 14 (e.g., an application processor AP).

The display 11 may output image data. The display 11 may be located on the front of the fingerprint recognition device so that a user can see visual information provided on the display 11. The display 11 may be controlled by the DDI 13.

The FPIC 10 may be coupled to the display 11, and may recognize a fingerprint touched on the display 11. For example, the FPIC 10 may recognize a fingerprint input provided on the display 11. The FPIC 10 may cover the whole display 11. For example, in exemplary embodiments, the FPIC 10 is not located in only a specific portion of the display 11, but rather, covers an entirety of the display 11. Thus, the FPIC 10 can scan fingerprint inputs provided on all parts of the display 11.

The FPIC 10 may be synchronized with the DDI 13. Thus, a clock CLK provided to the FPIC 10 and a clock CLK provided to the DDI 13 may be synchronized with each other.

In addition, the FPIC 10 may transmit image data Di to the processor 14 as a result of fingerprint recognition. The image data Di may be image data of a fingerprint recognized by the FPIC 10. For example, the FPIC 10 may scan a fingerprint to obtain image data Di corresponding to the fingerprint, and may transmit the image data Di to the processor 14.

The TSP 12 may be coupled to the display 11 and may sense a touch. For example, when the display 11 is touched, the TSP 12 may sense the touch and transmit coordinate data of the touch to the processor 14. Since the TSP 12 is coupled to the display 11 and detects a touch applied to a front surface of the display 11, the display 11 and the TSP 12 may function as an input/output device of the fingerprint recognition device. The FPIC 10 may be a fingerprint image input device.

The DDI 13 may drive the output of the display 11. An image of the light and color of the display 11 may be output by the DDI 13. The image output by the DDI 13 may be controlled by the processor 14. That is, the DDI 13 may be controlled by the processor 14.

The processor 14 may control the TSP 12, the DDI 13, and the FPIC 10. The processor 14 may receive a touch sensed by the TSP 12 and a fingerprint sensed by the FPIC 10. The processor 14 may control the output of the DDI 13 based on the received inputs. In addition, the processor 14 may be responsible for the management of the TSP 12, the DDI 13, and the FPIC 10.

Figure 2:
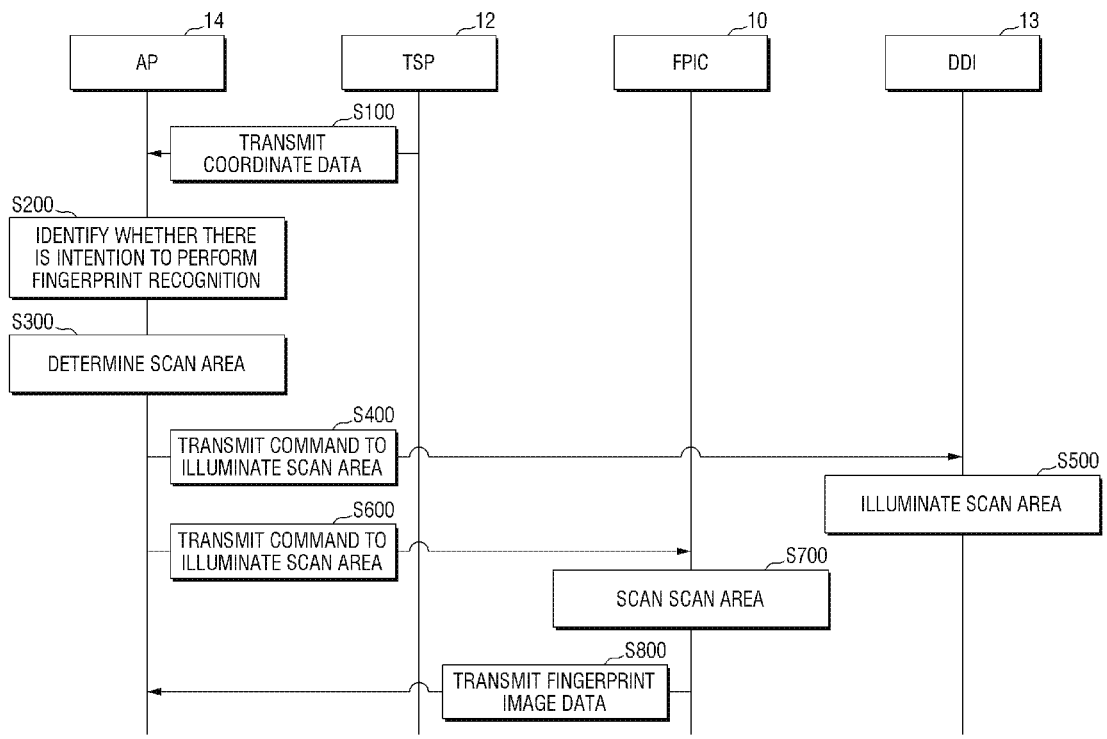
FIG. 2 is a flowchart illustrating the operation of the fingerprint recognition device of FIG. 1.

FIG. 2 is a flowchart illustrating the operation of the fingerprint recognition device of FIG. 1.

Referring to FIG. 2, at operation S100, the TSP 12 senses a touch and transmits coordinate data to the processor 14.

The coordinate data may be, for example, a plurality of coordinate data sensed by the TSP 12. For example, when a user continuously provides touch inputs, the TSP 12 may continuously transmit the coordinate data to the processor 14 in real time. For example, when multiple touch inputs are provided, the TSP 12 may continuously transmit different coordinate data corresponding to the multiple touch inputs to the processor 14 in real time as the multiple touch inputs are provided.

At operation S200, the processor 14 identifies whether there is an intention to perform fingerprint recognition.

For example, the processor 14 may identify whether a user intends to have his or her fingerprint recognized. That is, when it is detected that a touch input may have been provided, the processor 14 may determine whether there is an intention that fingerprint identification be performed. The processor 14 may determine whether there is the intention to perform fingerprint recognition based on the coordinate data received from the TSP 12.

If it is determined that there is the intention to perform fingerprint recognition, the fingerprint recognition device may continuously perform fingerprint recognition. However, if it is determined there is not an intention to perform fingerprint recognition, the fingerprint recognition device should not perform fingerprint recognition. For example, performing fingerprint recognition when it is not intended may result in decreased performance and efficiency of the fingerprint recognition device. Therefore, identifying whether there is the intention to perform fingerprint recognition may improve the performance and efficiency of the fingerprint recognition device.

For example, according to exemplary embodiments, when a user's finger touches the display 11 without an intention to perform fingerprint recognition, and the TSP 12 recognizes the touch, fingerprint recognition is not performed, as described in further detail below.

At operation S300, if it was previously determined that there was an intention to perform fingerprint recognition, the processor 14 determines a scan area.

The scan area may refer to a part of the display 11 that is less than the entirety of the display 11. For example, to perform fingerprint recognition in the entire area of the display 11, it may be required to increase the size of the FPIC 10 and to significantly increase the complexity of the configuration of the FPIC 10. To address these problems, the fingerprint recognition device according to exemplary embodiments may determine (or set) a part of the display 11 as the scan area and perform fingerprint recognition only within the scan area.

To this end, the scan area may be determined around the coordinate data. That is, the scan area may be defined with reference to the coordinate data. Determining the scan area will be described in more detail below.

At operation S400, the processor 14 transmits a command to illuminate the scan area to the DDI 13.

For example, as described above, a part of the display 11 (and not the entirety of the display 11) may be set as the scan area in which fingerprint recognition is to be performed. Accordingly, in the fingerprint recognition device according to exemplary embodiments, only the scan area in which a fingerprint is scanned is illuminated, and other parts of the display 11 that do not correspond to the scan area are not driven during fingerprint recognition. Thus, fingerprint recognition can be performed efficiently.

At operation S500, the DDI 13 illuminates the scan area.

For example, the DDI 13 may output white light or cyan light to the scan area of the display 11. This light may be output, reflected by a fingerprint, and used to perform fingerprint recognition on the fingerprint.

At operation S600, the processor 14 transmits a command (e.g., a scan command) to the FPIC 10 causing the scan area to be scanned. At operation S700, the fingerprint recognition device scans the scan area.

For example, in exemplary embodiments, the FPIC 10 may obtain image data of a fingerprint by scanning only the scan area of the display 11 and not scanning the entire area of the display 11. Here, although the scan area is only a part of the display 11, any part of the display 11 can be configured as the scan area. That is, different parts of the display 11 may be selected as the scan area. Therefore, the FPIC 10 can perform fingerprint recognition for the entire area of the display 11.

The FPIC 10 may detect light output by the DDI 13 and then reflected by a fingerprint. In exemplary embodiments, the illuminating and scanning of the scan area are performed almost simultaneously within a very short time.

However, since the display 11 is composed of a plurality of pixels and the DDI 13 controls the output of light for each of the pixels, a delay in the order of milliseconds may occur from a first pixel to a last pixel. In exemplary embodiments, the scan operation of the FPIC 10 takes this delay into consideration, and the FPIC 10 and the DDI 13 may receive clocks synchronized with each other and may synchronize their respective operations.

At operation S800, the FPIC 10 transmits fingerprint image data to the processor 14.

For example, referring to FIG. 1, the FPIC 10 may obtain the image data Di and transmit the image data Di to the processor 14. The processor 14 may receive the image data Di and perform authentication or other operations based on the image data Di.

In exemplary embodiments, the processor 14 may perform fingerprint recognition. Alternatively, in exemplary embodiments, the TSP 12, the DDI 13 and the FPIC 10 may perform fingerprint recognition instead of the processor 14.

Figure 3:
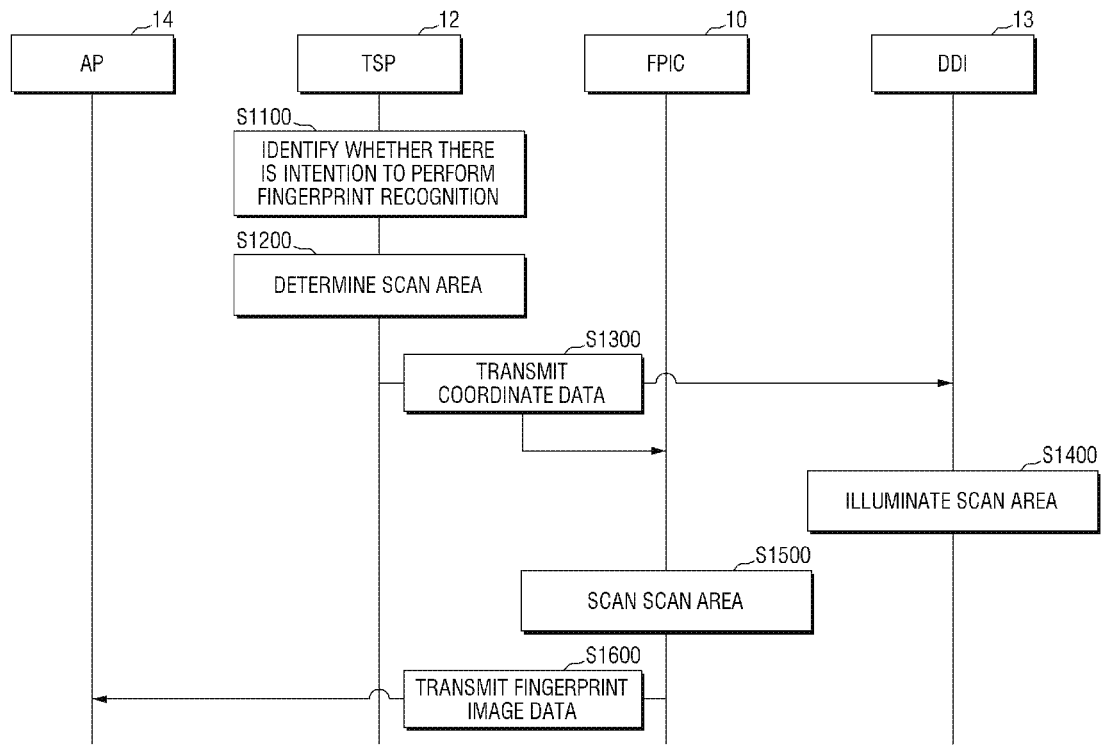
FIG. 3 is a flowchart illustrating the operation of a fingerprint recognition device according to exemplary embodiments.

FIG. 3 is a flowchart illustrating the operation of a fingerprint recognition device according to exemplary embodiments. For convenience of explanation, a further description of elements and technical aspects previously described may be omitted.

At operation S1100, a TSP 12 identifies whether there is an intention to perform fingerprint recognition.

For example, referring to FIG. 1, the TSP 12 may identify whether there is the intention to perform fingerprint recognition based on coordinate data of a touch input by a user. If there is the intention to perform fingerprint recognition, the fingerprint recognition device may continuously perform fingerprint recognition. If there is no intention to perform fingerprint recognition, the fingerprint recognition device does not perform fingerprint recognition.

Referring again to FIG. 3, at operation S1200, if it is determined that there is the intention to perform fingerprint recognition, the TSP 12 determines a scan area.

For example, referring to FIG. 1, in exemplary embodiments, the TSP 12 may determine the scan area without involvement of the processor 14. Accordingly, since communication between the processor 14 and the TSP 12 is not needed in exemplary embodiments to determine the scan area, a scan operation can be performed more concisely and rapidly.

Referring again to FIG. 3, at operation S1300, the TSP 12 transmits the coordinate data to the DDI 13 and the FPIC 10.

Then, at operation S1400, the DDI 13 illuminates the scan area.

For example, referring to FIG. 1, in exemplary embodiments, the DDI 13 may illuminate the scan area without involvement of the processor 14.

Referring again to FIG. 3, at operation S1500, the FPIC 10 scans the scan area.

For example, referring to FIG. 1, in exemplary embodiments, the FPIC 10 may scan the scan area without involvement of the processor 14. The scanning may be performed by detecting light that is reflected after being output by the DDI 13.

Referring again to FIG. 3, at operation S1600, the FPIC 10 transmits fingerprint image data to the processor 14.

In exemplary embodiments, the DDI 13, the TSP 12 and the FPIC 10 can perform fingerprint recognition with little or no involvement of the processor 14. This reduces the amount of computation needed to be performed by the processor 14 and eliminates unnecessary communication with the processor 14, thereby increasing the speed of the fingerprint recognition operation.

Figure 4:
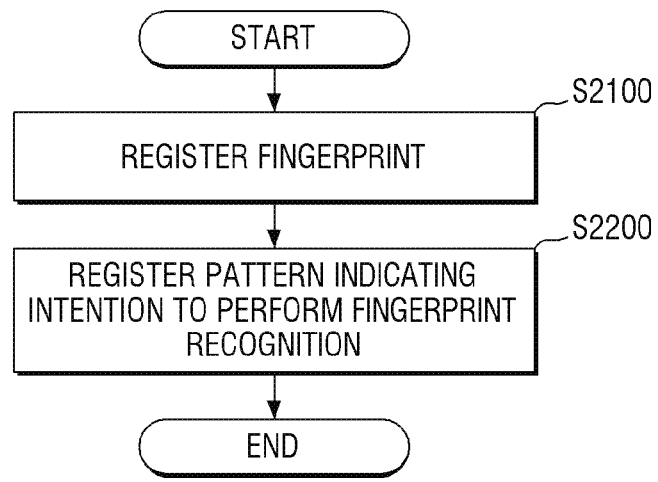
FIG. 4 is a flowchart illustrating the initial setting of a fingerprint recognition device according to exemplary embodiments.

FIG. 4 is a flowchart illustrating the initial setting of a fingerprint recognition device according to exemplary embodiments.

Referring to FIG. 4, the fingerprint recognition device according to exemplary embodiments may register a fingerprint and a pattern through an initial setting.

First, at operation S2100, a fingerprint is registered.

For example, referring to FIG. 1, a fingerprint of a user's finger is registered and stored as basic data for fingerprint recognition. That is, in exemplary embodiments, authentication and other subsequent operations can only be performed when the same fingerprint as the registered fingerprint is recognized.

In exemplary embodiments, a fingerprint can be registered only through the FPIC 10, the registered fingerprint may be managed by the processor 14, and the fingerprint registration may be performed through the operation of the processor 14, the FPIC 10, the DDI 13 and/or the TSP 12.

Referring again to FIG. 4, next, at operation 52200, a pattern indicating an intention to perform fingerprint recognition is registered.

The pattern may later be used to identify whether there is the intention to perform fingerprint recognition. The pattern may be, for example, a specific gesture, the number of fingers that touch the display 11, a touch at a specific position, or the distance between fingers that touch the display 11. However, the pattern is not limited thereto. For example, in exemplary embodiments, even though it may be detected that a finger has touched the display 11, fingerprint recognition is only performed if the pattern registered in operation 52200 is detected first.

Figure 5:
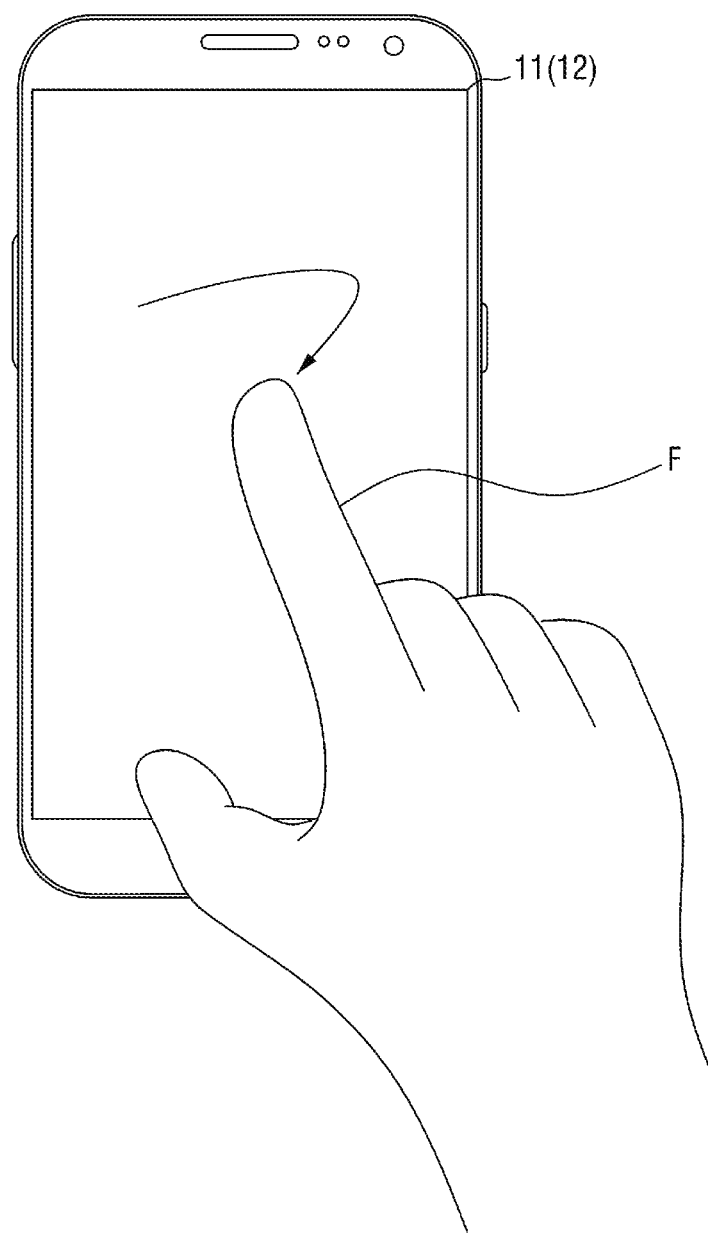
FIG. 5 is a conceptual diagram for describing how a pattern is used by a fingerprint recognition device to identify an intention to perform fingerprint recognition according to exemplary embodiments.

FIG. 5 is a conceptual diagram for describing how a pattern is used by a fingerprint recognition device to identify an intention to perform fingerprint recognition according to exemplary embodiments.

Referring to FIG. 5, the pattern indicating the intention to perform fingerprint recognition may be a specific shape drawn on a display 11 and a TSP 12 with a finger F. For example, a gesture such drawing a Z, 0 or W without taking the finger F off the display 11 may be registered as the pattern indicating the intention to perform fingerprint recognition.

That is, when a gesture registered in advance with the finger F is input to the display 11 and the TSP 12, it can be determined that there is the intention to perform fingerprint recognition. For example, in exemplary embodiments, assuming that a gesture of drawing a Z without taking the finger F off the display 11 is registered as the pattern, fingerprint recognition will only be performed upon detection of the gesture of drawing a Z.

Figure 6:
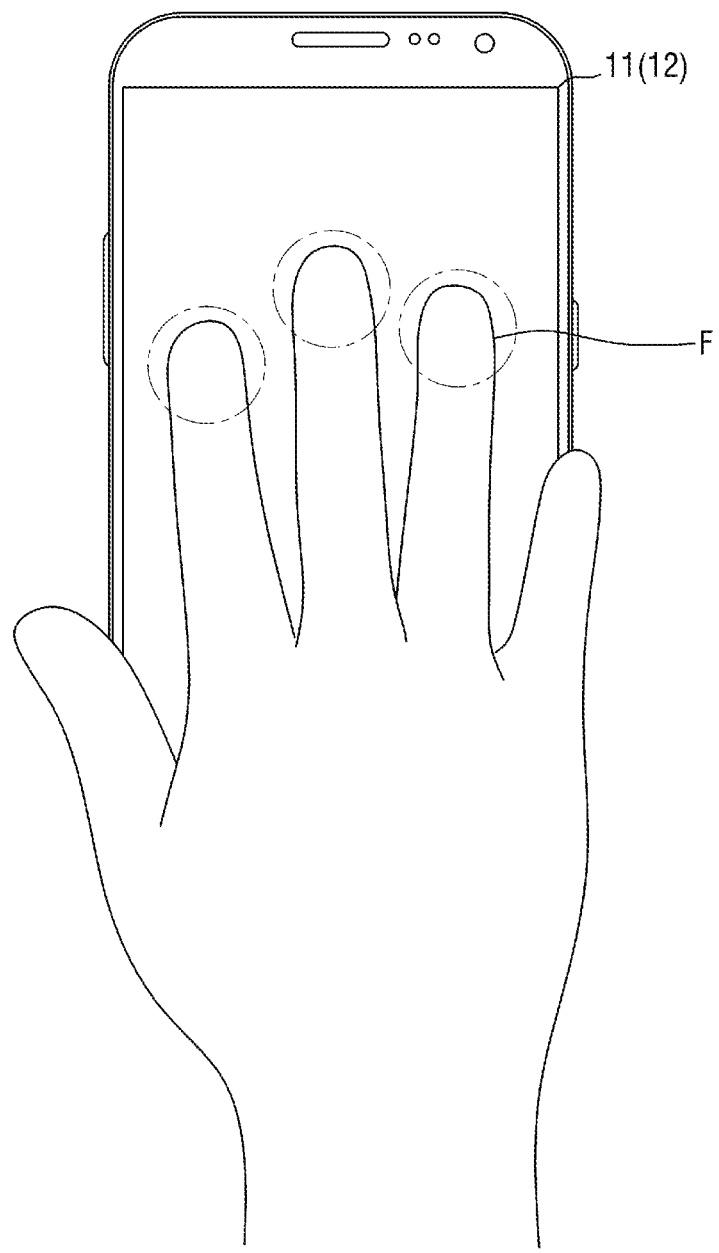
FIG. 6 is a conceptual diagram for describing how a pattern is used by a fingerprint recognition device to identify an intention to perform fingerprint recognition according to exemplary embodiments.

FIG. 6 is a conceptual diagram for describing how a pattern is used by a fingerprint recognition device to identify an intention to perform fingerprint recognition according to exemplary embodiments.

Referring to FIG. 6, the pattern indicating the intention to perform fingerprint recognition may correspond to the number of fingers F that touch the display 11 at the same time. For example, when three fingers F simultaneously touch the display 11, it may be determined that there is the intention to perform fingerprint recognition. In exemplary embodiments, the pattern may correspond to less than three fingers F or more than three fingers F.

Figure 7:
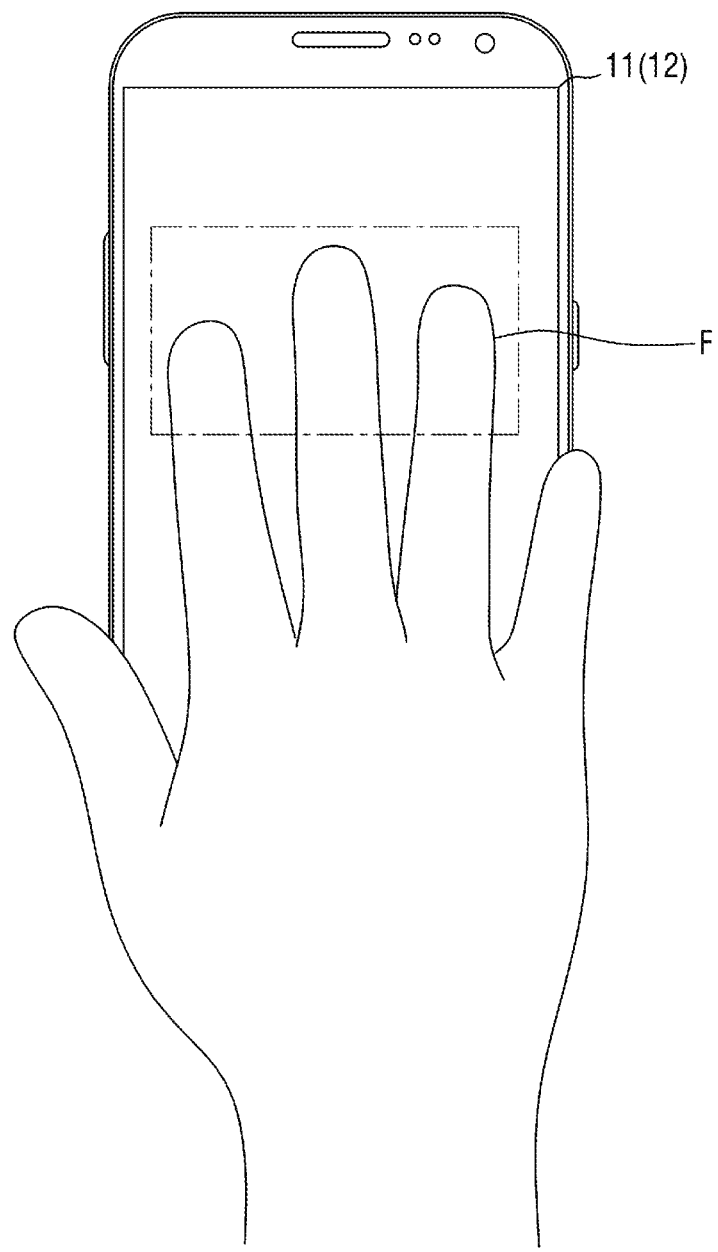
FIG. 7 is a conceptual diagram for describing how a pattern is used by a fingerprint recognition device to identify an intention to perform fingerprint recognition according to exemplary embodiments.

FIG. 7 is a conceptual diagram for describing how a pattern is used by a fingerprint recognition device to identify an intention to perform fingerprint recognition according to exemplary embodiments.

Referring to FIG. 7, the pattern indicating the intention to perform fingerprint recognition may correspond to a specific area of the display 11 and the TSP 12 being touched by a finger F. For example, in exemplary embodiments, a specific area may be set as a target detection area, and only when the finger F touches the target detection area of the display 11 and the TSP 12 is it determined that there is the intention to perform fingerprint recognition.

Figure 8:
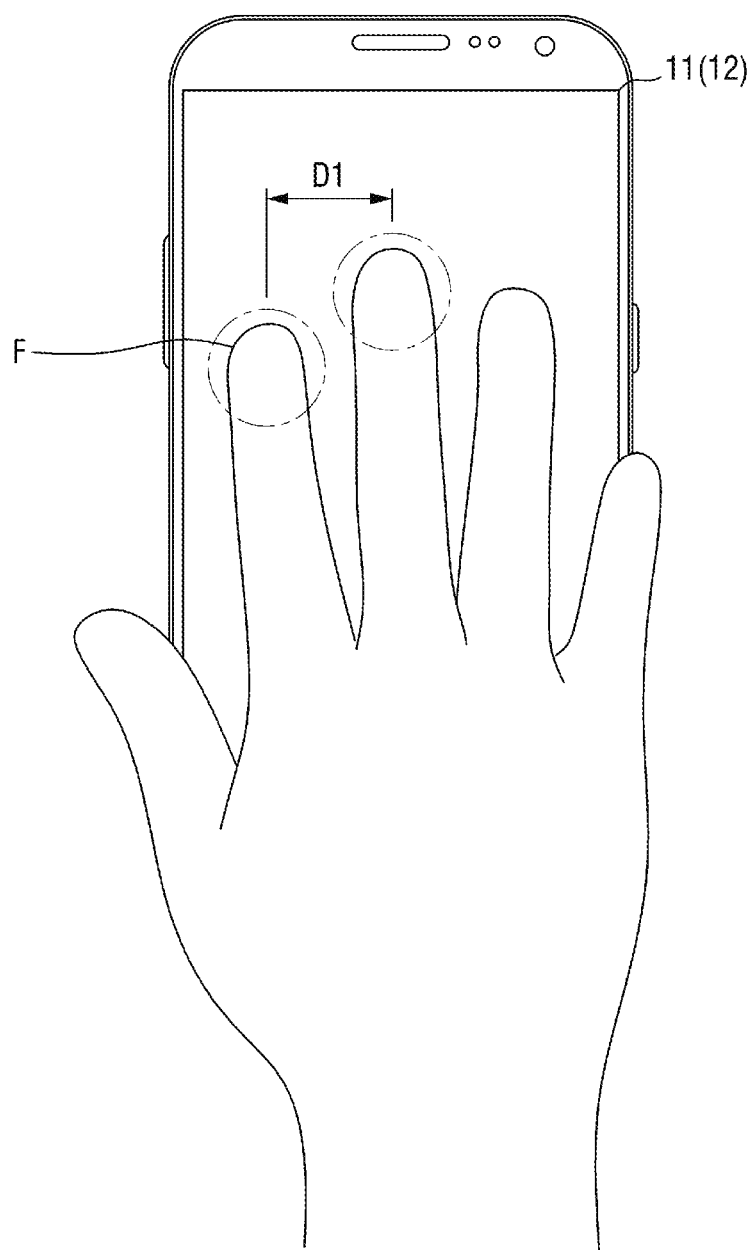
FIG. 8 is a conceptual diagram for describing how a pattern is used by a fingerprint recognition device to identify an intention to perform fingerprint recognition according to exemplary embodiments.

FIG. 8 is a conceptual diagram for describing how a pattern is used by a fingerprint recognition device to identify an intention to perform fingerprint recognition according to exemplary embodiments.

Referring to FIG. 8, the pattern indicating the intention to perform fingerprint recognition may be the distance between two fingers F that touch a display 11. For example, if the distance between two fingers F that touch the display 11 is registered as a first distance D1, subsequently, when two fingers F that touch the display 11 are spaced apart by the first distance D1, it may be determined that there is the intention to perform fingerprint recognition.

In exemplary embodiments, it may be determined that there is the intention to perform fingerprint recognition as long as the distance between the two fingers F is at least the registered distance D1. For example, in exemplary embodiments, there is no limit on how much larger than D1 the distance between the two fingers F is. That is, once the distance between the two fingers F reaches the registered distance D1, it is determined that there is the intention to perform fingerprint recognition.

Alternatively, in exemplary embodiments, a maximum threshold larger than D1 may also be registered. In such exemplary embodiments, if the distance between the two fingers F is greater than D1 but is also greater than the maximum threshold, it is determined that there is no intention to perform fingerprint recognition. That is, in such exemplary embodiments, it is determined that there is an intention to perform fingerprint recognition when the distance between the two fingers F is at least equal to D1 and is less than or equal to the maximum threshold.

Figure 9:
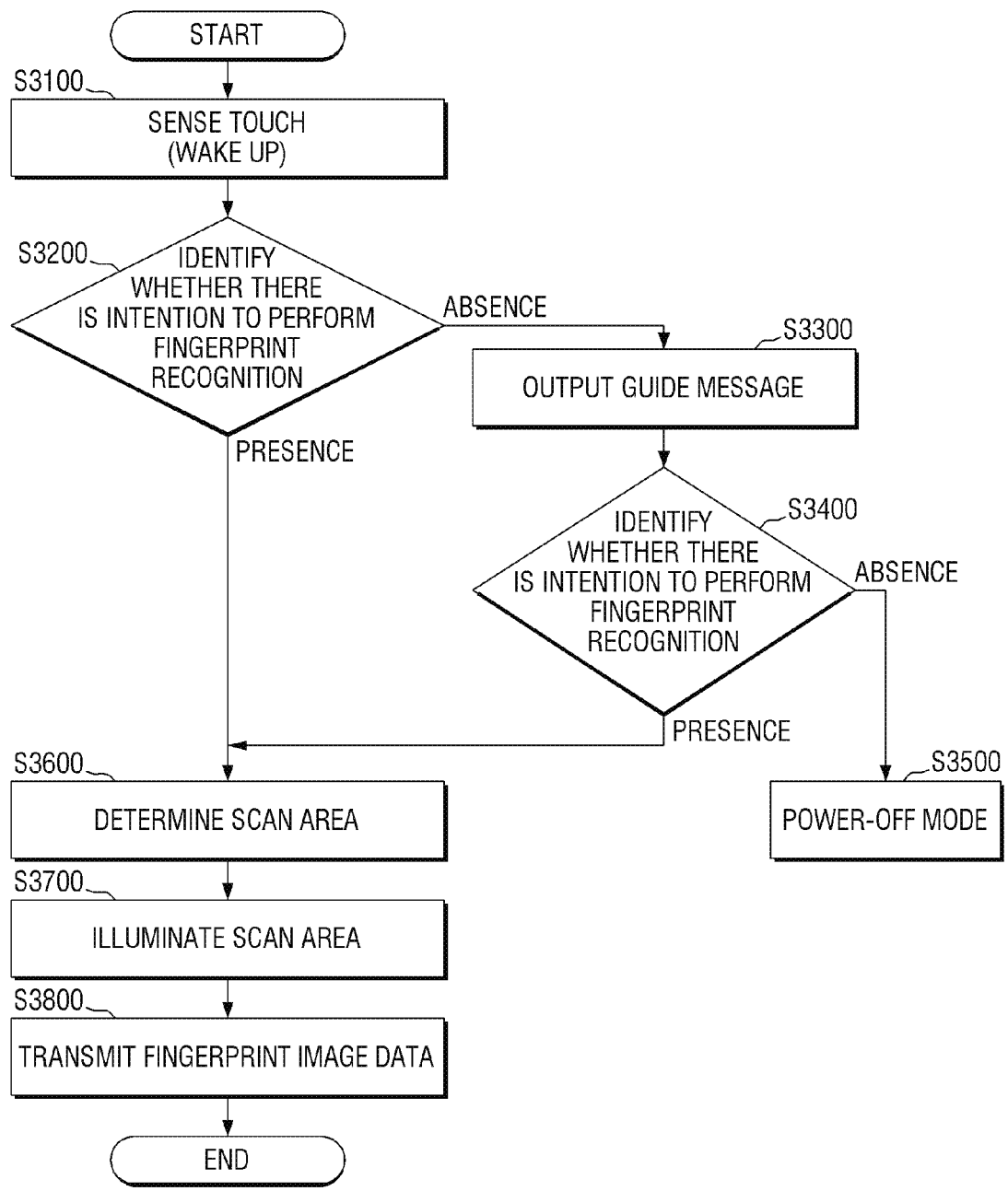
FIG. 9 is a flowchart illustrating a fingerprint recognition process of a fingerprint recognition device according to exemplary embodiments.

FIG. 9 is a flowchart illustrating a fingerprint recognition process of a fingerprint recognition device according to exemplary embodiments.

Referring to FIG. 9, at operation S3100, the fingerprint recognition device may be woken up in response to a touch sensed. For example, the fingerprint recognition device may be in a sleep state or a low-power state, in which the fingerprint recognition device consumes less power, until the fingerprint recognition device is woken up in response to a touch sensed.

For example, referring to FIG. 1, the TSP 12 may sense a touch and wake up the fingerprint recognition device.

Referring again to FIG. 9, at operation S3200, it is identified whether there is an intention to perform fingerprint recognition.

If a user does not intend to have his or her fingerprint recognized (absence), a guide message is output at operation S3300.

Referring to FIG. 1, the guide message may be output to the display 11. If the user intends to have his or her fingerprint recognized, the guide message may be a message requesting the user to input a preregistered pattern. Through this message, the user's intention can be identified more clearly.

Referring again to FIG. 9, at operation S3400, it is identified again whether there is the intention to perform fingerprint recognition.

Since the user can input, once again, the pattern indicating the intention to perform fingerprint recognition in response to the guide message, the fingerprint recognition device can identify the user's intention once again.

If there is no intention to perform fingerprint recognition (absence), the woken-up fingerprint recognition device switches back to the mode it was in before being woken up. For example, the fingerprint recognition device may switch back to a power-off mode or low-power mode.

Here, the power-off mode or low-power mode refers to a mode in which no power or minimum power is provided to prevent unnecessary battery consumption.

If it is determined in operation S3200 or S3400 that there is the intention to perform fingerprint recognition (presence), a scan area is determined at operation S3600.

For example, referring to FIG. 1, the determination of the scan area may be performed by the processor 14 or the TSP 12. The scan area is an area in which a fingerprint is scanned. The scan area may be a part of the display 11.

Referring again to FIG. 9, at operation S3700, the scan area may be illuminated.

For example, referring to FIG. 1, the scan area may be illuminated by the DDI 13. Here, the processor 14 may command the DDI 13 to illuminate the scan area, or the DDI 13 may illuminate the scan area without being prompted by the processor 14.

Referring again to FIG. 9, fingerprint image data is transmitted at operation S3800.

For example, referring to FIG. 1, the image data may be obtained by the FPIC 10. The FPIC 10 may generate the image data Di by detecting light that is emitted by the DDI 13 and then reflected by a fingerprint.

The FPIC 10 may transmit the obtained image data of the fingerprint to the processor 14.

Figure 10:
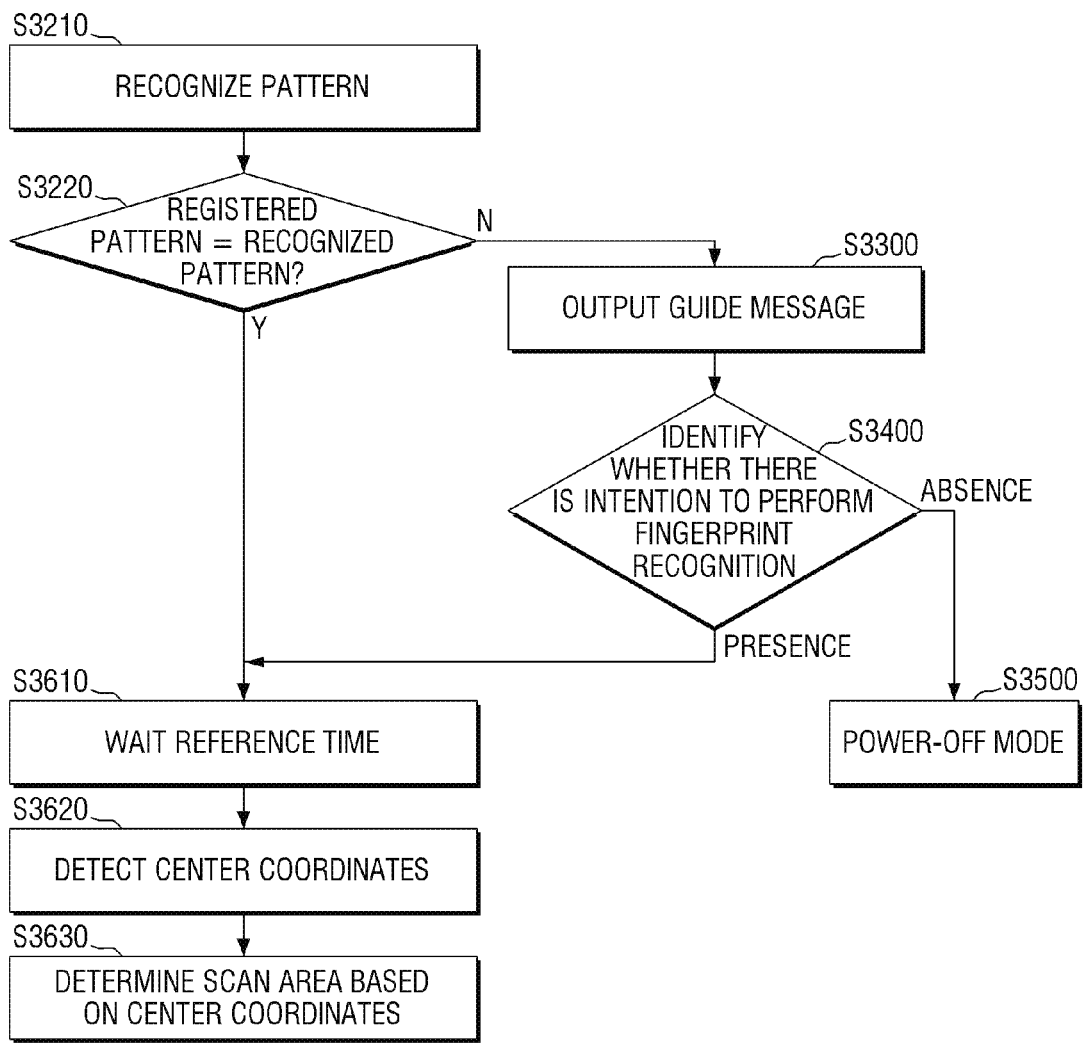
FIG. 10 is a detailed flowchart illustrating the processes of identifying whether there is an intention to perform fingerprint recognition and determining a scan area, as described with reference to FIG. 9.
Figure 11:
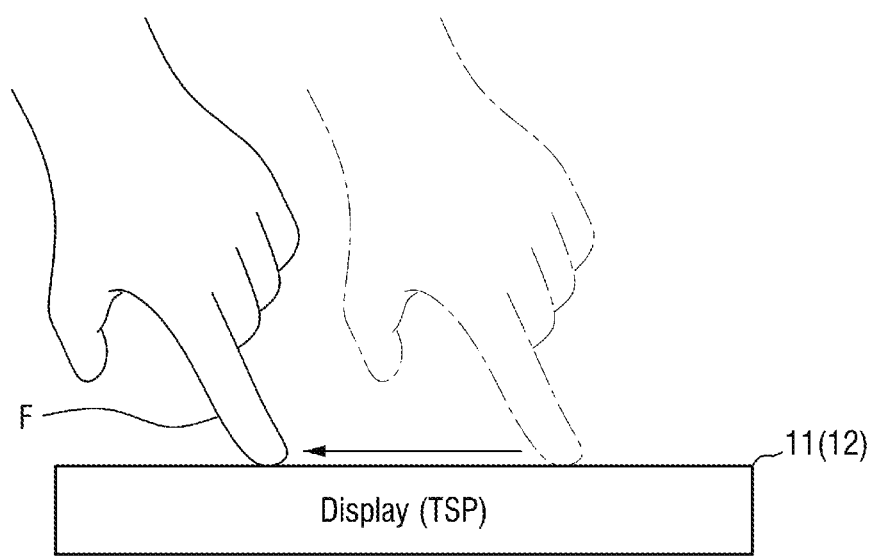
FIG. 11 is a conceptual diagram for describing the process of determining the scan area, as described with reference to FIG. 10.

FIG. 10 is a detailed flowchart illustrating the processes of identifying whether there is the intention to perform fingerprint recognition and determining the scan area, as described with reference to FIG. 9. FIG. 11 is a conceptual diagram for describing the process of determining the scan area, as described with reference to FIG. 10.

Referring to FIG. 10, identifying whether there is the intention to perform fingerprint recognition (operation S3200 in FIG. 9) includes the following operations.

First, at operation S3210, a pattern is recognized/detected.

The pattern may be a pattern registered in advance to identify the intention to perform fingerprint recognition as described above, for example, with reference to FIGS. 5 through 8.

Next, at operation S3220, the recognized pattern is compared with the registered pattern.

If the registered pattern is different from the recognized pattern, it is determined that there is no intention to perform fingerprint recognition (absence). If the registered pattern is the same as the recognized pattern, it is determined that there is the intention to perform fingerprint recognition (presence).

If it is determined that the registered pattern is different from the recognized pattern at operation S3220, a guide message is output at operation S3300. After the guide message is outputted, it is identified again whether there is the intention to perform fingerprint recognition at operation S3400. If it is determined that there is not the intention to perform fingerprint recognition, a power-off mode or low-power mode is entered into at operation S3500, as described above.

If it is determined at operations S3220 and S3400 that there is the intention to perform fingerprint recognition, a reference time is initiated and observed at operation S3610.

Here, the reference time is a time in units of microseconds or milliseconds, and may be a time given until coordinates for a scan area are determined. That is, when it is determined that there is the intention to perform fingerprint recognition based on a pattern input using a finger F, the reference time may be measured from the time of determination. For example, the reference time may be measured from the time that it is determined that there exists the intention to perform fingerprint recognition.

Next, at operation S3620, center coordinates are detected.

For example, referring to FIG. 11, the center coordinates may refer to coordinates of a central part of the scan area. For example, the center coordinates may refer to coordinates of a point that the finger F touches after the reference time elapses.

Referring again to FIG. 10, at operation S3630, the scan area is determined based on the center coordinates.

For example, referring to FIG. 1, the scan area may be an area of a specific size defined around the center coordinates. The scan area may be determined by the processor 14, the TSP 12, or the FPIC 10.

Accordingly, after inputting a pattern to the display 11 and the TSP 12, a user can naturally perform fingerprint recognition in an area in which the finger F is located.

Figure 12:
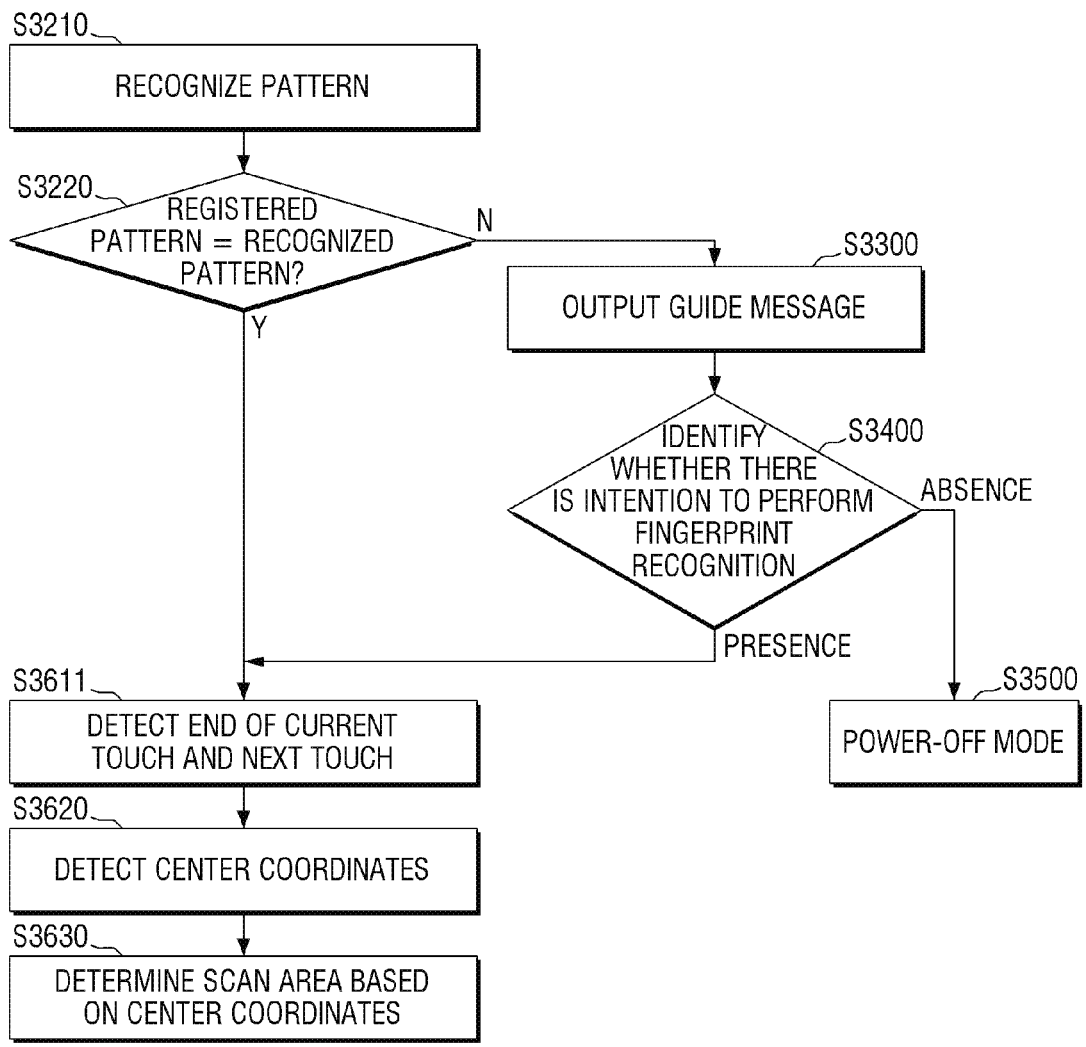
FIG. 12 is a detailed flowchart illustrating a process in which a fingerprint recognition device identifies whether there is an intention to perform fingerprint recognition and determines a scan area according to exemplary embodiments.
Figure 13:
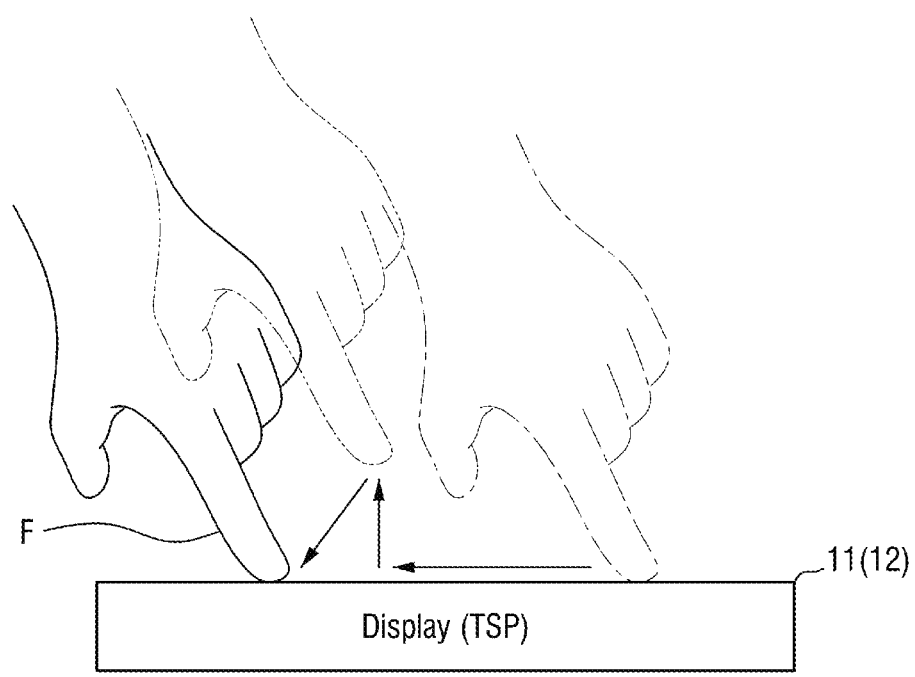
FIG. 13 is a conceptual diagram for describing determining the scan area, as described with reference to FIG. 12.

FIG. 12 is a detailed flowchart illustrating a process in which a fingerprint recognition device identifies whether there is an intention to perform fingerprint recognition and determines a scan area according to exemplary embodiments. FIG. 13 is a conceptual diagram for describing determining the scan area, as described with reference to FIG. 12.

Recognizing a pattern (operation S3210), comparing a registered pattern with the recognized pattern (operation S3220), outputting a guide message (operation S3300), identifying again whether there is the intention to perform fingerprint recognition (operation S3400), and entering a power-off mode or a low-power mode (operation S3500) are the same as the corresponding operations of FIG. 10. Accordingly, for convenience of explanation, a further description thereof is omitted.

If it is determined in operations S3220 and S3400 that there is the intention to perform fingerprint recognition, an end of a current touch and a next touch are sensed at operation S3611.

For example, referring to FIGS. 1 and 13, a touch for inputting a pattern and then another touch made after a finger F is taken off the display 11 may be sensed. The touch sensing may be performed by the TSP 12.

Referring again to FIG. 12, center coordinates are detected at operation S3620.

For example, referring to FIG. 13, the center coordinates may refer to coordinates of a point that the finger F touches after being taken off the display 11. A scan area is determined based on the center coordinates at operation S3630, which is the same as that of FIG. 10, and thus will not be described again.

Therefore, after inputting a pattern to the display 11 and the TSP 12, a user can designate the scan area by making a touch for fingerprint recognition. This method can more clearly separate the pattern recognition and the fingerprint recognition processes, thus preventing the confusion of the user. For example, in exemplary embodiments, a pattern may be input at a first location of the display 11, and the scan area may be designated as a second location of the display 11 different from the first location.

Hereinafter, FPICs according to exemplary embodiments will be described with reference to FIGS. 14 through 28. The FPICs to be described with reference to FIGS. 14 through 28 have the same configuration as the FPIC 10 of FIG. 1. Thus, a further description of elements and technical aspects previously described may be omitted.

Figure 14:
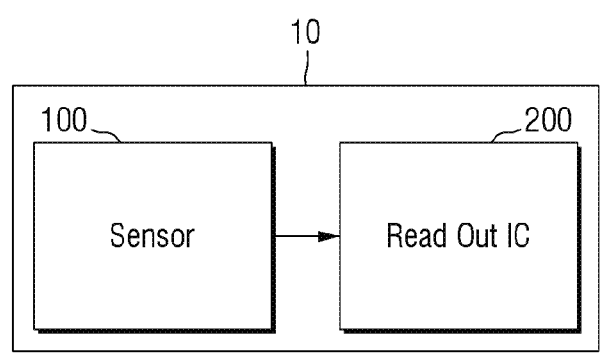
FIG. 14 is a block diagram of a fingerprint recognition integrated circuit (FPIC) according to exemplary embodiments.

FIG. 14 is a block diagram of an FPIC 10 according to exemplary embodiments.

Referring to FIG. 14, the FPIC 10 according to exemplary embodiments includes a sensor 100 and a first read-out integrated circuit (IC) 200.

The sensor 100 may receive light reflected by a fingerprint and convert the received light into an electric charge. The sensor 100 may transmit the electric charge to the first read-out IC 200. The first read-out IC 200 may read the output of the sensor 100 and output image data Di of the fingerprint.

Figure 15:
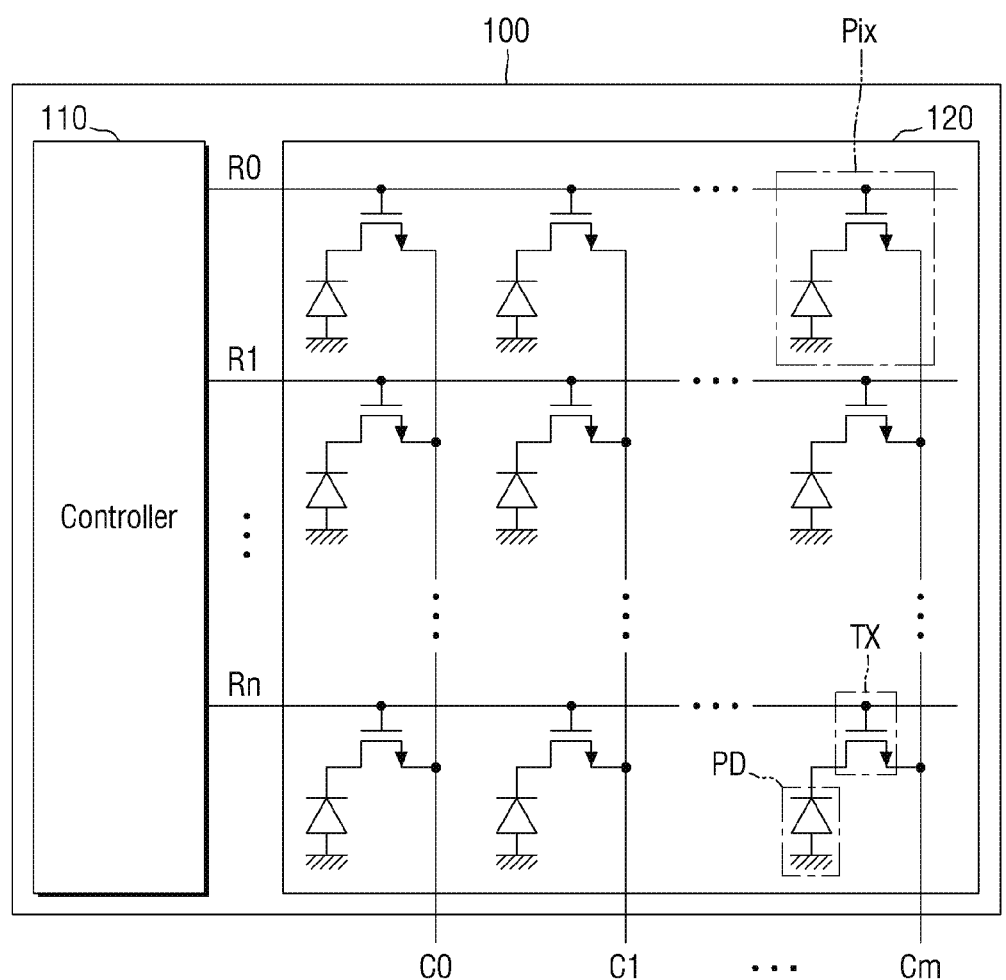
FIG. 15 is a detailed block diagram of a sensor of FIG. 14.

FIG. 15 is a detailed block diagram of the sensor 100 of FIG. 14.

Referring to FIG. 15, the sensor 100 may include a controller 110 and a first pixel array 120.

The controller 110 may control the first pixel array 120. The controller 110 may control the reset, selection and amplification operations of pixels Pix constituting the first pixel array 120, and control the driving of each transfer transistor TX.

The controller 110 may independently control a plurality of rows R0 through Rn of the first pixel array 120.

The first pixel array 120 may include a plurality of pixels Pix (P(0,0) through P(n,m)). Herein, n and m are positive integers. The pixels Pix may be arranged in the rows R0 through Rn and a plurality of columns respectively including a plurality of output lines C0 through Cm. That is, the pixels Pix arranged in each column may share one of the output lines C0 through Cm.

Each of the pixels Pix may include a photodiode PD and a transfer transistor TX.

The photodiode PD may be a photoelectric element that receives light and generates an electric charge. The photodiode PD may generate an electric charge corresponding to light reflected by a fingerprint.

The transfer transistor TX may transfer the electric charge generated by the photodiode PD to the first read-out IC 200 through one of the output lines C0 through Cm. That is, when a gate voltage is applied to the transfer transistor TX, an output of a pixel Pix corresponding to the transfer transistor TX may be output to a corresponding one of the output lines C0 through Cm.

Figure 16:
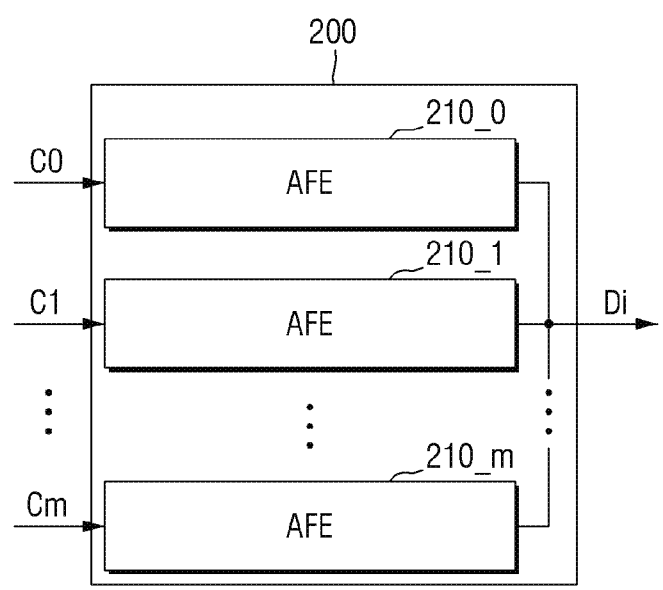
FIG. 16 is a detailed block diagram of a first read-out IC of FIG. 14.

FIG. 16 is a detailed block diagram of the first read-out IC 200 of FIG. 14.

Referring to FIG. 16, the first read-out IC 200 includes a plurality of analog front ends (AFEs) 210_0 through 210_m. Each AFE may also be referred to as an AFE circuit.

The AFEs 210_0 through 210_m may correspond to the output lines C0 through Cm, respectively. That is, an equal number of the AFEs 210_0 through 210_m to the number of columns of the first pixel array 120 may be connected in a one-to-one correspondence to the columns of the first pixel array 120.

Respective outputs of the AFEs 210_0 through 210_m may form image data Di of a fingerprint, and the image data Di may be output.

Figure 17:
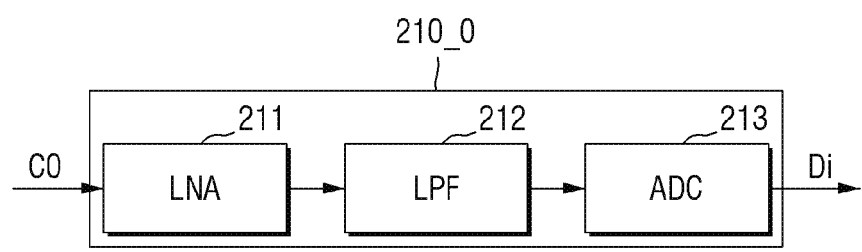
FIG. 17 is a detailed block diagram of an analog front end (AFE) of FIG. 16.

FIG. 17 is a detailed block diagram of an AFE of FIG. 16.

Referring to FIG. 17, a first AFE 210_0 may include a low noise amplifier (LNA) 211, a low pass filter (LPF) 212, and an analog-to-digital converter (ADC) 213. Although the structure of only the first AFE 210_0 is illustrated for the sake of convenience, the structures of the AFEs 210_1 through 210_m may be the same as the structure of the first AFE 210_0.

The LNA 211 may be connected to any one of the output lines C0 through Cm. The LNA 211 may convert an electric charge output from a pixel into a voltage.

The LPF 212 may remove high-frequency noise of the voltage output from the LNA 211.

The ADC 213 may output image data of the pixel by converting the analog voltage output from the LPF 212 into a digital signal.

Figure 18:
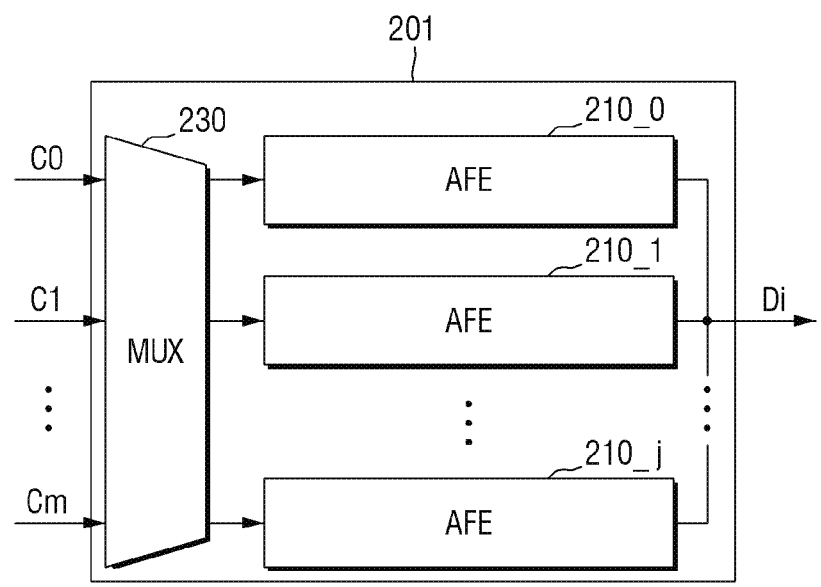
FIG. 18 is a block diagram of an FPIC according to exemplary embodiments.

FIG. 18 is a block diagram of an FPIC according to exemplary embodiments. For convenience of explanation, a further description of elements and technical aspects previously described may be omitted.

Referring to FIG. 18, the FPIC according to exemplary embodiments includes a second read-out IC 201.

The second read-out IC 201 may include a plurality of AFEs 210_0 through 210_j and a first multiplexer 230. Herein, j is a positive integer.

The first multiplexer 230 may connect a plurality of output lines C0 through Cm to the AFEs 210_0 through 210_j. The first multiplexer 230 may connect the (m+1) output lines C0 through Cm to the (j+1) AFEs 210_0 through 210_j. Here, m may be a number greater than j.

The first multiplexer 230 may reduce the complexity of the FPIC by reducing the number of AFEs. In addition, although signals of the output lines C0 through Cm are not processed at the same time, they can all be eventually processed by the AFEs 210_0 through 210_j. Therefore, there is no signal loss, or signal loss may be reduced. Accordingly, the FPIC according to exemplary embodiments provides improved performance.

Figure 19:
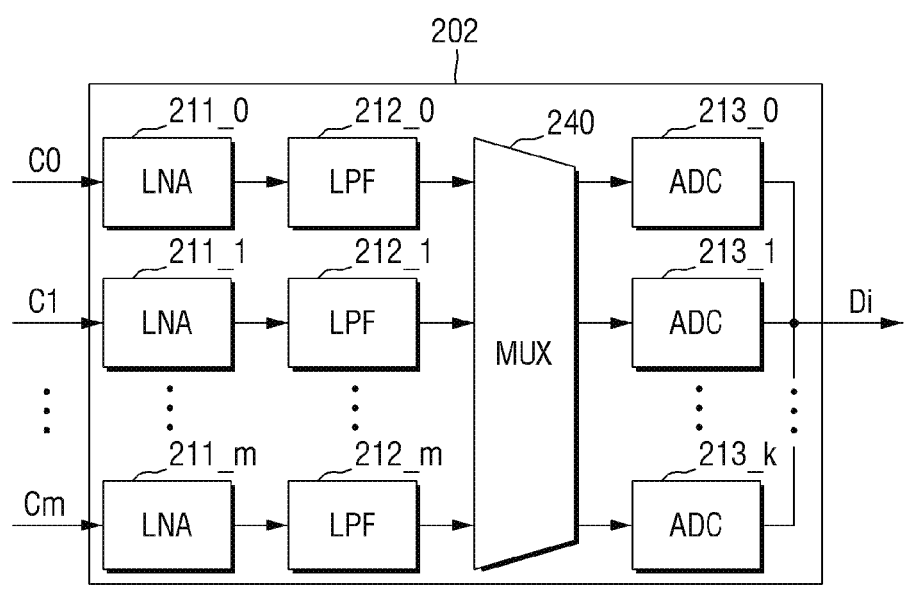
FIG. 19 is a block diagram of an FPIC according to exemplary embodiments.

FIG. 19 is a block diagram of an FPIC according to exemplary embodiments. For convenience of explanation, a further description of elements and technical aspects previously described may be omitted.

Referring to FIG. 19, the FPIC according to exemplary embodiments includes a third read-out IC 202.

The third read-out IC 202 may include a plurality of LNAs 211_0 through 211_m, a plurality of LPFs 212_0 through 212_m, a second multiplexer 240, and a plurality of ADCs 213_0 through 213_k. Herein, k is a positive integer.

The LNAs 211_0 through 211_m and the LPFs 212_0 through 212_m may correspond one-to-one to a plurality of output lines C0 through Cm. That is, the number of the LNAs 211_0 through 211_m and the number of the LPFs 212_0 through 212_m may be (m+1), which is equal to the number of the output lines C0 through Cm.

The second multiplexer 240 may connect the LPFs 212_0 through 212_m to the ADCs 213_0 through 213_k. The second multiplexer 240 may connect the (m+1) LNAs 211_0 through 211_m and the (m+1) LPFs 212_0 through 212_m to the (k+1) ADCs 213_0 through 213_k. Here, m may be a number greater than k.

The second multiplexer 240 may reduce the complexity of the FPIC according to exemplary embodiments by reducing the number of ADCs. In addition, although signals of the LPFs 212_0 through 212_m are not processed at the same time, they can all be eventually processed by the ADCs 213_0 through 213_k. Therefore, there is no signal loss, or signal loss may be reduced.

Figure 20:
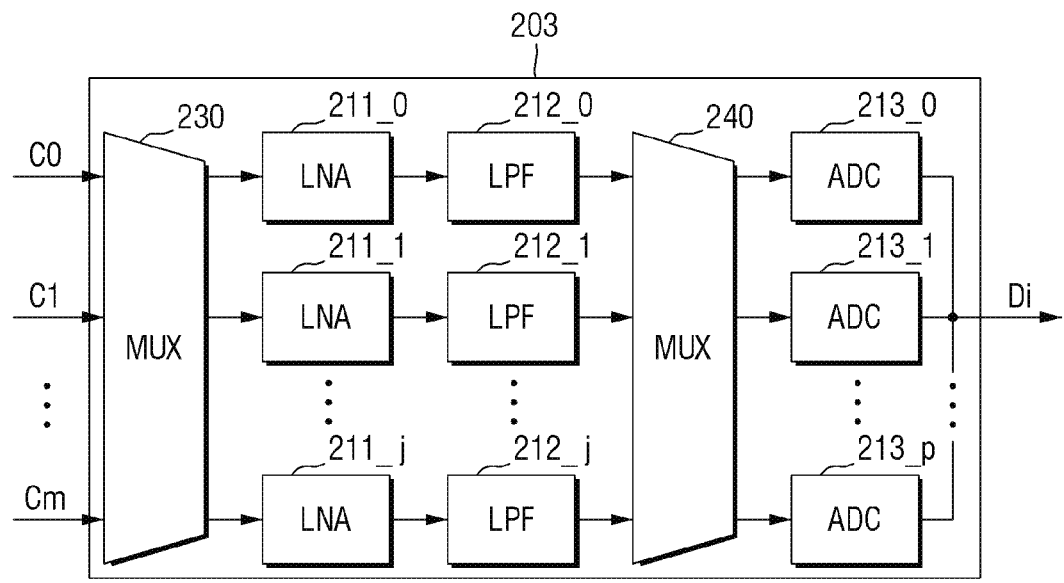
FIG. 20 is a block diagram of an FPIC according to exemplary embodiments.

FIG. 20 is a block diagram of an FPIC according to exemplary embodiments. For convenience of explanation, a further description of elements and technical aspects previously described may be omitted.

Referring to FIG. 20, the FPIC according to exemplary embodiments includes a fourth read-out IC 203.

The fourth read-out IC 203 may include a first multiplexer 230, a plurality of LNAs 211_0 through 211_j, a plurality of LPFs 212_0 through 212_j, a second multiplexer 240, and a plurality of ADCs 213_0 through 213_p. Herein, p is a positive integer.

The first multiplexer 230 may connect a plurality of output lines C0 through Cm to the LNAs 211_0 through 211_j. The first multiplexer 230 may connect the (m+1) output lines C0 through Cm to the (j+1) LNAs 211_0 through 211_j. Here, m may be a number greater than j.

The LNAs 211_0 through 211_j and the LPFs 212_0 through 212_j may correspond one-to-one to each other. Here, the number of the LNAs 211_0 through 211_j and the number of the LPFs 212_0 through 212_j may be (j+1) which is smaller than (m+1), that is, is the number of the output lines C0 through Cm.

The second multiplexer 240 may connect the LPFs 212_0 through 212_j to the ADCs 213_0 through 213_p. The second multiplexer 240 may connect the (j+1) LNAs 211_0 through 211_j and the (j+1) LPFs 212_0 through 212_j to the (p+1) ADCs 213_0 through 213_p. Here, j may be a number greater than p.

Figure 21:
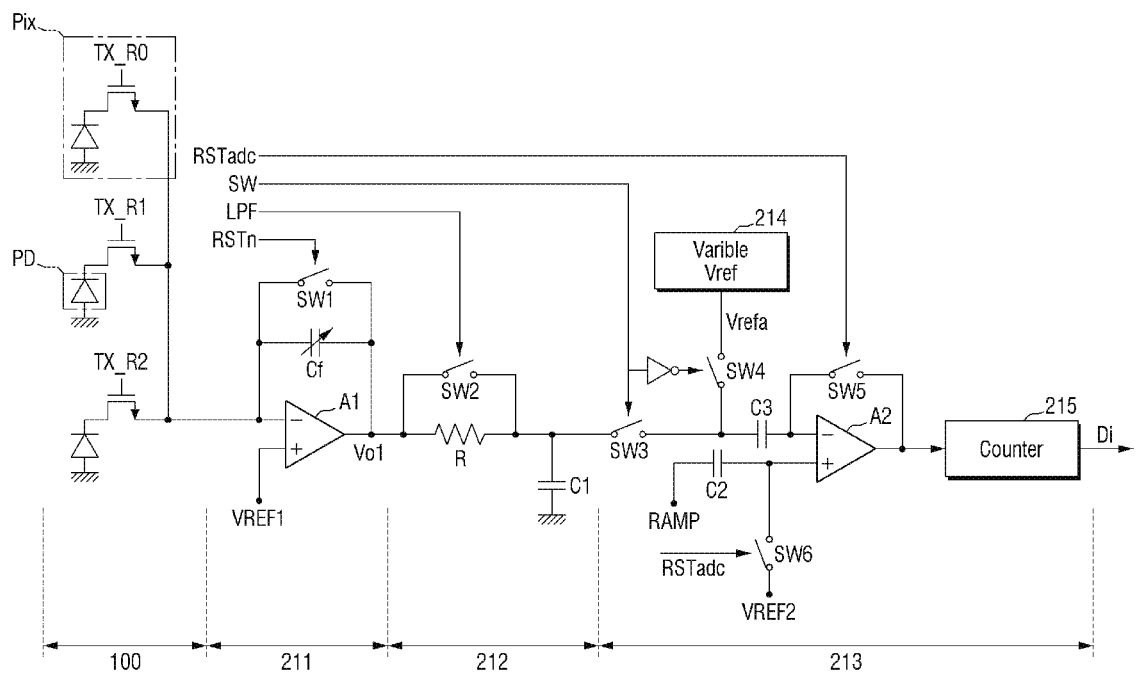
FIG. 21 is an equivalent circuit diagram of an FPIC according to exemplary embodiments.
Figure 22:
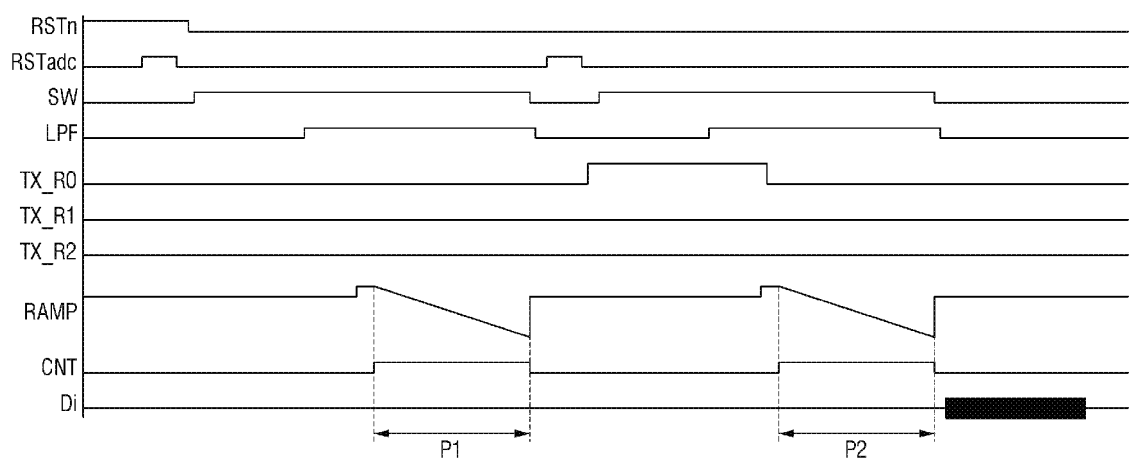
FIG. 22 is a timing diagram of operation signals of FIG. 21.

FIG. 21 is an equivalent circuit diagram of an FPIC according to exemplary embodiments. FIG. 22 is a timing diagram of operation signals of FIG. 21. For convenience of explanation, a further description of elements and technical aspects previously described may be omitted.

Referring to FIGS. 21 and 22, a sensor 100 includes a plurality of pixels Pix. Each of the pixels Pix includes a photodiode PD and a transfer transistor. In FIG. 21, three transfer transistors, that is, a first transfer transistor TX_R0, a second transfer transistor TX_R1, and a third transfer transistor TX_R2 are illustrated. However, exemplary embodiments are not limited to this case, and the number of transfer transistors can vary.

An LNA 211 may include a first amplifier A1, a charge capacitor Cf, and a first switch SW1.

A first reference voltage VREF1 may be applied to a positive (+) terminal of the first amplifier A1. A negative (−) terminal of the first amplifier A1 may be connected to an output line of a pixel Pix. The charge capacitor Cf may be connected to the negative terminal of the first amplifier A1 and a first output voltage terminal Vo1. The first switch SW1 may be connected in parallel to the charge capacitor Cf.

When the first switch SW1 is operated by a reset signal RSTn, the charge capacitor Cf may be initialized according to the reset signal RSTn. When the reset signal RSTn is turned off while a gate voltage of the first transfer transistor TX_R0 is turned on, the charge capacitor Cf may be charged with an electric charge Q accumulated in the photodiode PD.

Here, the first output voltage Vo1 may be Vo1=VREF1+Q/Cf.

An LPF 212 may include a resistor R, a second switch SW2, and a first capacitor C1. The second switch SW2 may operate according to an LPF signal LPF. To speed up settling, the LPF signal LPF may turn on the second switch SW2 and then turn off the second switch SW2. Accordingly, a second output voltage Vo2 may quickly transition from a transient response to a saturation response.

An ADC 213 may include a third switch SW3, a variable reference voltage generator 214, a fourth switch SW4, a second amplifier A2, a second capacitor C2, a third capacitor C3, a fifth switch SW5, a sixth switch SW6, and a counter 215. The counter 215 may also be referred to as a counter circuit.

The third switch SW3 and the fourth switch SW4 may be operated by a switch signal SW. The third switch SW3 and the fourth switch SW4 may operate in a complementary manner. That is, when any one of the third switch SW3 and the fourth switch SW4 is turned on, the other may be turned off.

The switch signal SW may be turned off and then turned on. Accordingly, the third switch SW3 may be opened, and the fourth switch SW4 may be closed. Then, as the fourth switch SW4 is opened, the third switch SW3 may be closed.

Therefore, when the third switch SW3 is opened while the fourth switch SW4 is closed, the first capacitor C1 of the LPF 212 may be charged with the first output voltage Vo1, and the second output voltage Vo2 may be a variable reference voltage Vrefa. Then, when the third switch SW3 is closed while the fourth switch SW4 is opened, the second output voltage Vo2 may become Vo2=Vrefa−Vo1.

The fifth switch SW5 and the sixth switch SW6 may be driven by an ADC reset signal RSTadc. The ADC reset signal RSTadc may be turned on for initialization and then turned off. Accordingly, a positive terminal of the second amplifier A2 may be initialized to a second reference voltage VREF2, and a negative terminal and an output terminal of the second amplifier A2 may also be initialized to the second reference voltage VREF2.

The second capacitor C2, the third capacitor C3 and the second amplifier A2 may constitute a comparator which compares a ramp voltage RAMP and a third output voltage Vi3n. That is, 0 may be output when the third output voltage Vi3n is smaller than the ramp voltage RAMP, and 1 may be output when the third output voltage Vi3n is greater than the ramp voltage RAMP.

The sensor 100 outputs a reset output and then a signal output. Here, the reset output refers to an output when there is no signal, and the signal output refers to the reset output containing a signal component.

Accordingly, the ramp voltage RAMP in a first section P1 may be used to count the reset output, and the ramp voltage RAMP in a second section P2 may be used to count the signal output. In FIG. 22, CNT may denote counting. The final image data Di may be generated after the second section P2.

Later, the ADC 213 performs correlated double sampling for removing noise by subtracting the reset output from the signal output. To this end, the ADC 213 may use the first capacitor C1 of the LPF 212. A conventional ADC uses two to four capacitors for correlated double sampling. In contrast, the ADC 213 of the FPIC according to exemplary embodiments uses only one capacitor, thereby reducing the complexity of the circuit.

The variable reference voltage generator 214 may generate the variable reference voltage Vrefa. The variable reference voltage Vrefa may be generated to adjust an input dynamic range (IDR) of the ADC 213.

For example, the third output voltage Vi3$n$ is a value obtained by subtracting the second output voltage Vo2 from the second reference voltage VREF2. That is, Vi3$n$=VREF2−Vo2. Since Vo2=Vrefa−Vo1 and Vo1=VREF1+Q/Cf, Vi3$n$=VREF2−Vrefa+VREF1+Q/Cf.

The third output voltage Vi3$n$ may be adjusted by the first reference voltage VREF1, the second reference voltage VREF2, and the variable reference voltage Vrefa.

The counter 215 may convert an analog signal into a digital signal by counting an output of the second amplifier A2, that is, an output of the comparator. The digital signal may be the image data Di.

Figure 23:
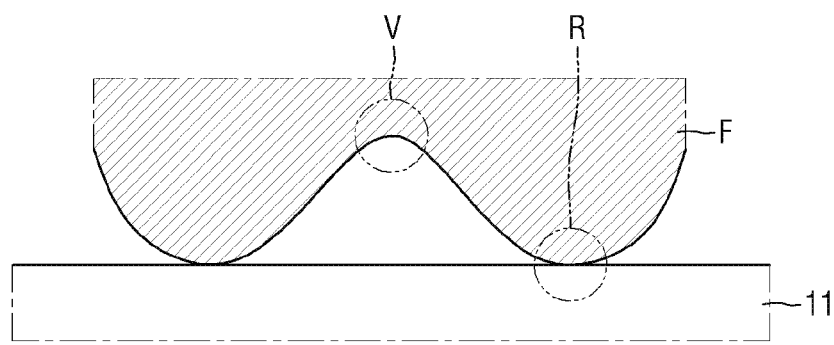
FIG. 23 is a conceptual diagram for describing a fingerprint recognition operation of a fingerprint recognition device according to exemplary embodiments.

FIG. 23 is a conceptual diagram for describing a fingerprint recognition operation of a fingerprint recognition device according to exemplary embodiments.

Referring to FIG. 23, a fingerprint of a finger F may include ridges R and valleys V. The ridges R may be convex portions adjacent to the surface of a display 11, and the valleys V may be concave portions spaced apart from the surface of the display 11. The difference between light reflected by the ridges R and light reflected by the valleys V may be very small.

Figure 24:
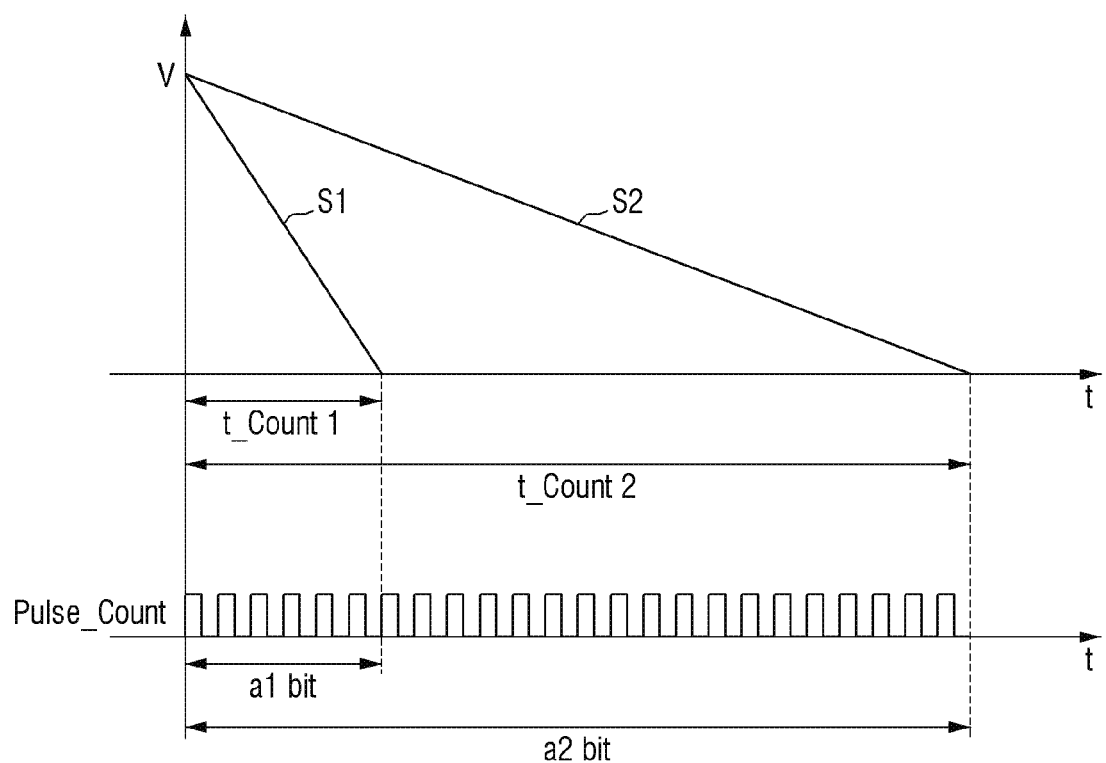
FIG. 24 is a graph illustrating a ramp voltage and a counting operation of a fingerprint recognition device according to exemplary embodiments.

FIG. 24 is a graph illustrating the ramp voltage RAMP and a counting operation of a fingerprint recognition device according to exemplary embodiments.

Referring to FIGS. 21, 22 and 24, a counter 215 may perform counting using a count pulse Pulse_Count. When the ramp voltage RAMP has a first slope S1, the counter 215 may generate a digital signal of a first bit "a1 bit" during a first count time t_Count 1. Alternatively, when the ramp voltage RAMP has a second slope S2 smaller than the first slope S1, the counter 215 may generate a digital signal of a second bit "a2 bit" during a second count time t_Count 2.

That is, in a single slope ADC having a single slope, the smaller the slope, the higher the resolution. However, reducing the slope to increase the resolution may increase the time for counting to the second count time t_Count 2 which is greater than the first count time t_Count 1.

Figure 25:
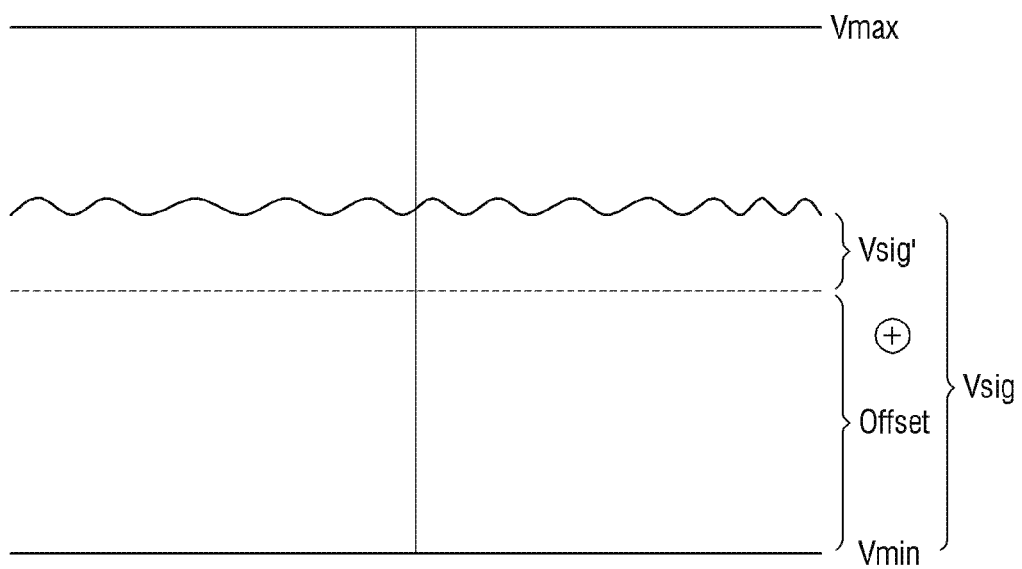
FIG. 25 is a voltage graph illustrating a signal voltage of a fingerprint recognition device according to exemplary embodiments.
Figures 26, 27:
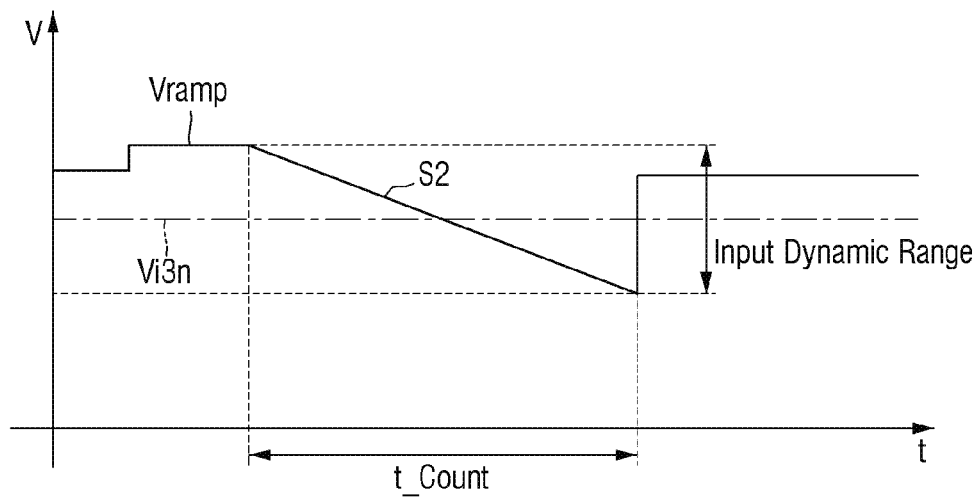
FIG. 26 is a graph illustrating an input dynamic range (IDR) of the fingerprint recognition device according to the embodiments.
FIG. 27 illustrates the structure of a pixel array of a sensor of an FPIC according to exemplary embodiments.

FIG. 25 is a voltage graph illustrating a signal voltage of a fingerprint recognition device according to exemplary embodiments. FIG. 26 is a graph illustrating an IDR of the fingerprint recognition device according to exemplary embodiments.

Referring to FIGS. 23 through 25, an FPIC according to exemplary embodiments may have high resolution because the difference between valleys V and ridges R is very small. Assuming that an output of the FPIC is a full signal voltage Vsig, the full signal voltage Vsig may have several sections of values from a minimum voltage Vmin to a maximum voltage Vmax in order for high resolution.

However, since a band that actually varies according to the difference between the valleys V and the ridges R is very small, this can be considered separately. For example, the full signal voltage Vsig can be considered as the sum of an offset and a partial signal voltage Vsig'. In this case, it is not necessary to use the entire second count time t_Count 2 by making a portion where the ramp voltage RAMP is actually measured and converted have the second slope S2. Instead, only the first count time t_Count 1 can be used for the second slope S2.

For example, referring to FIG. 26, since the third output voltage Vi3$n$ is defined as Vi3$n$=VREF2−Vrefa+VREF1+Q/Cf by the above-described equation, it can be adjusted to the IDR of the ramp voltage Vramp having the second slope S2 by adjusting the variable reference voltage Vrefa. Accordingly, a count time t_Count can be as short as the first count time t_Count 1 of FIG. 24.

As described above, in exemplary embodiments, the third output voltage Vi3$n$ can be adjusted by adjusting the variable reference voltage Vrefa while the first reference voltage VREF1 and second reference voltage VREF2 are fixed. However, in an FPIC according to exemplary embodiments, not only the variable reference voltage Vrefa but also the first reference voltage VREF1 and/or the second reference voltage VREF2 can be varied to adjust the third output voltage Vi3$n$ to the IDR of the ramp voltage Vramp.

An FPIC according to exemplary embodiments will now be described with reference to FIGS. 27 and 28. For convenience of explanation, a further description of elements and technical aspects previously described may be omitted.

FIG. 27 illustrates the structure of a pixel array of a sensor of an FPIC according to exemplary embodiments. FIG. 28 is a timing diagram for describing a scan operation of the FPIC according to exemplary embodiments.

Referring to FIG. 27, a first pixel array 120 includes a plurality of pixels P(0,0) through P(n,m). The first pixel array 120 includes a plurality of rows H1 through Hn, and the rows H1 through Hn include a first row H1, a second row H2 . . . through an $n^{th}$ row Hn.

Figure 28:
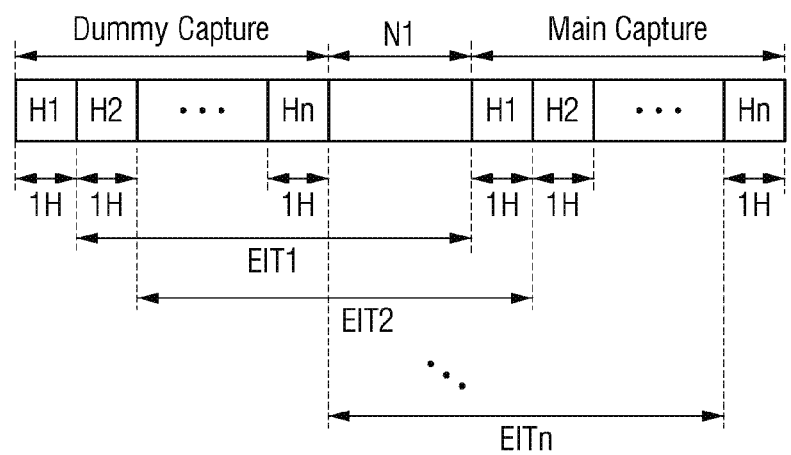
FIG. 28 is a timing diagram for describing a scan operation of the FPIC according to exemplary embodiments.

Referring to FIGS. 27 and 28, the FPIC according to exemplary embodiments may perform a dummy capture operation for fingerprint recognition and then perform a main capture operation. Here, the dummy capture operation refers to scanning a scan area without an exposure integration time (EIT).

The EIT refers to a period of time during which each pixel receives external light. The EIT may last from one scan to a next scan.

Therefore, a meaningless scan, that is, the dummy capture operation, may be performed in order to initialize the EIT, and then the main capture operation may be performed after a first pause N1 for making respective EITs of the pixels equal.

In the dummy capture operation or the main capture operation, capturing or scanning may be performed on a row-by-row basis, and the time taken to capture each of the rows H1 through Hn may be the same row scan time 1H.

In addition, an EIT may be given to each row. A first EIT EIT1 of the first row H1 may last from a time when the dummy capture operation of the first row H1 ends to a time when the main capture operation of the first row H1 begins. A second EIT EIT2 of the second row H2 may last from a time when the dummy capture operation of the second row H2 ends to a time when the main capture operation of the second row H2 begins.

Similarly, an $n^{th}$ EIT EITn of the $n^{th}$ row Hn may last from a time when the dummy capture operation of the $n^{th}$ row Hn ends to a time when the main capture operation of the $n^{th}$ row Hn begins.

The first pause N1 may be a period of time generated by these EITs.

Figure 29:
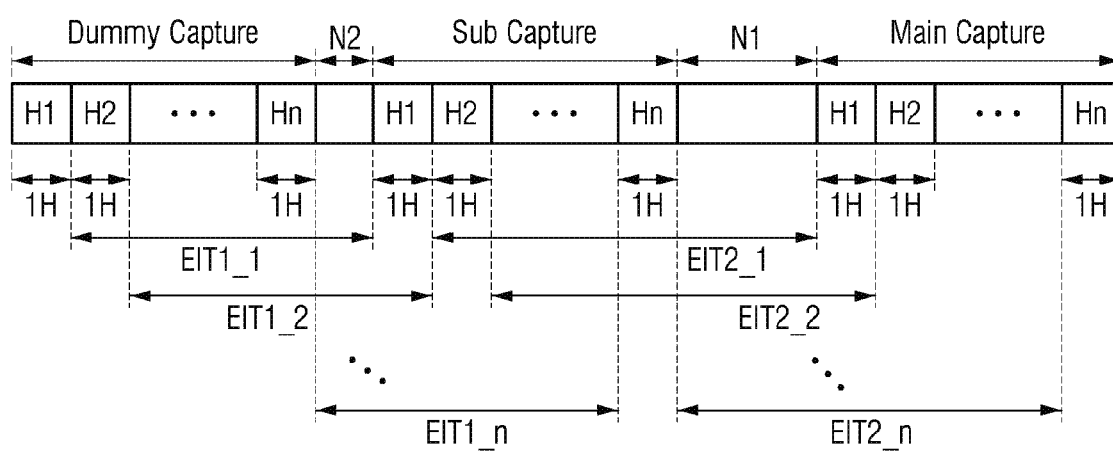
FIG. 29 is a timing diagram for describing a scan operation of an FPIC according to exemplary embodiments.

FIG. 29 is a timing diagram for describing a scan operation of an FPIC according to exemplary embodiments. For convenience of explanation, a further description of elements and technical aspects previously described may be omitted.

Referring to FIGS. 21, 22, 27 and 29, the FPIC according to exemplary embodiments may perform a sub capture operation between the dummy capture operation and the main capture operation.

Since the dummy capture operation is performed for initialization, there is no EIT at all. However, the sub capture operation has an EIT, and thus, a second pause N2 may exist between the dummy capture operation and the sub capture operation.

In addition, since an EIT for the main capture operation is also utilized, a first pause N1 may exist between the sub capture operation and the main capture operation.

Since an EIT is given to each row, a $(1\_1)^{th}$ EIT EIT1_1 of a first row H1 may last from a time when the dummy capture operation of the first row H1 ends to a time when the sub capture operation of the first row H1 begins, and a $(2\_1)^{th}$ EIT EIT2_1 of the first row H1 may last from a time when the sub capture operation of the first row H1 ends to a time when the main capture operation of the first row H1 begins. The $(2\_1)^{th}$ EIT EIT2_1 may be longer than the $(1\_1)^{th}$ EIT EIT1_1.

A $(1\_2)^{th}$ EIT EIT1_2 of a second row H2 may last from a time when the dummy capture operation of the second row H2 ends to a time when the sub capture operation of the second row H2 begins, and a $(2\_2)^{th}$ EIT EIT2_2 of the second row H2 may last from a time when the sub capture operation of the second row H2 ends to a time when the main capture operation of the second row H2 begins. The $(2\_2)^{th}$ EIT EIT2_2 may be longer than the $(1\_2)^{th}$ EIT EIT1_2.

Similarly, a $(1\_n)^{th}$ EIT EIT1_n of an $n^{th}$ row Hn may last from a time when the dummy capture operation of the $n^{th}$ row Hn ends to a time when the sub capture operation of the $n^{th}$ row Hn begins, and a $(2\_n)^{th}$ EIT EIT2_n of the $n^{th}$ row Hn may last from a time when the sub capture operation of the $n^{th}$ row Hn ends to a time when the main capture operation of the $n^{th}$ row Hn begins. The $(2\_n)^{th}$ EIT EIT2_n may be longer than the $(1\_n)^{th}$ EIT EIT1_n. Referring to FIGS. 21 and 22, a reset output and a signal output are used for correlated double sampling performed to remove noise. However, in exemplary embodiments, the reset output may remove only the noise of the LNA 211, the LPF 212 and the ADC 213, but not the noise of the sensor 100.

Therefore, to remove the noise of the sensor 100, the FPIC according to exemplary embodiments may perform the sub capture operation in which transfer transistors of the sensor 100 are turned on and then the result of the sub capture operation is subtracted from the result of the main capture operation.

However, if the sub capture operation has a long EIT, more signal components may be included in the sub capture operation. Therefore, the EIT (EIT1_1, EIT1_2, . . . , EIT1_n) of the sub capture operation may be made very short, so that there is substantially no signal component in the sub capture operation. Accordingly, the second pause N2 may be very short as compared with the first pause N1.

Since the FPIC according to exemplary embodiments can completely remove even the noise of the sensor 100 through the sub capture operation, the FPIC can perform more accurate and reliable fingerprint recognition.

Figure 30:
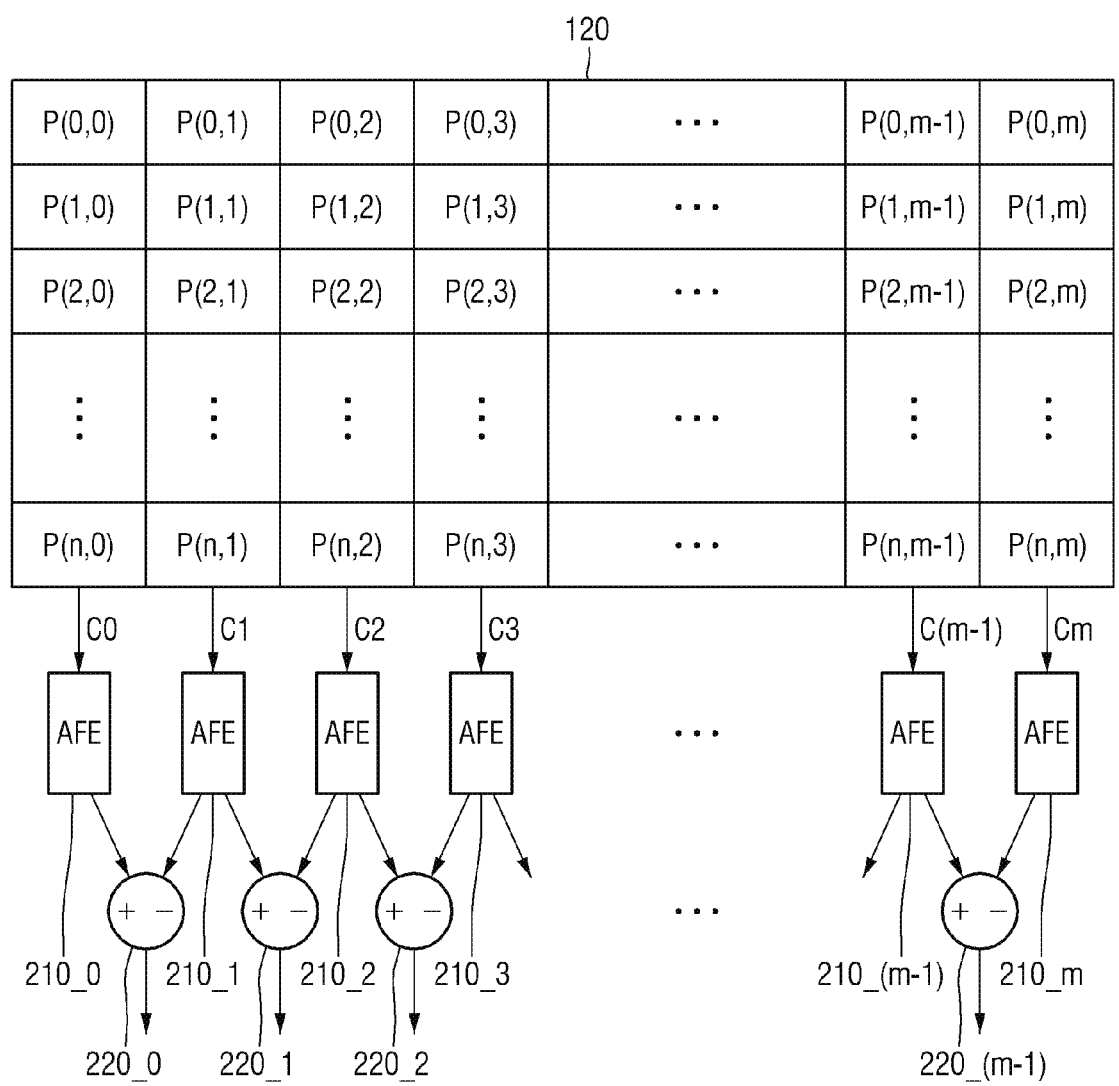
FIG. 30 is a conceptual block diagram of an FPIC according to exemplary embodiments.

FIG. 30 is a conceptual block diagram of an FPIC according to exemplary embodiments. For convenience of explanation, a further description of elements and technical aspects previously described may be omitted.

Referring to FIG. 30, the FPIC according to exemplary embodiments may include a first pixel array 120, a plurality of AFEs 210_0 through 210_m, and a plurality of subtractors 220_0 through 220_(m−1).

The first pixel array 120 may include a plurality of pixels P(0,0) through P(n,m), and the AFEs 210_0 through 210_m may be connected in a one-to-one correspondence to a plurality of output lines C0 through Cm corresponding to columns of the first pixel array 120.

Each of the subtractors 220_0 through 220_(m−1) may output a difference between outputs of two adjacent ones of the AFEs 210_0 through 210_m. That is, each of the subtractors 220_0 through 220_(m−1) may output a difference signal obtained by subtracting an output of one AFE from an output of another AFE. Thus, each of the subtractors 220_0 through 220_(m−1) may output a difference between the digital signals Di of two adjacent AFEs. Since the subtractors 220_0 through 220_(m−1) subtract outputs of the (m+1) AFEs 210_0 through 210_m from each other, m subtractors 220_0 through 220_(m−1) may be utilized. Each of the subtractors 220_0 through 220_(m−1) may also be referred to as a subtractor circuit.

Since the difference signals are signals from which a noise component common to all pixels has been removed, the difference signals may include clearer more highly reliable fingerprint image data.

Therefore, the FPIC according to exemplary embodiments can perform more accurate fingerprint recognition.

Figure 31:
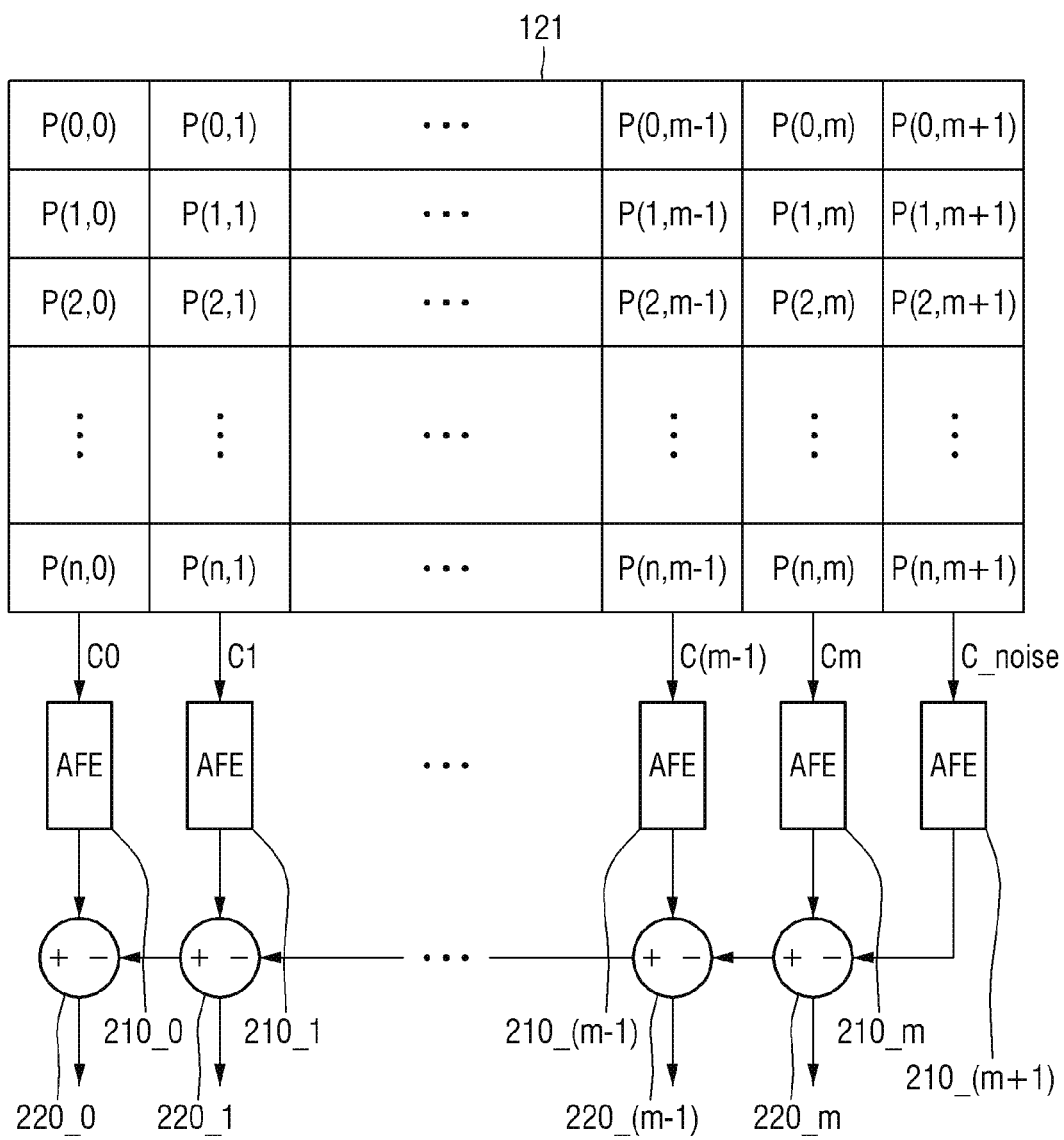
FIG. 31 is a conceptual block diagram of an FPIC according to exemplary embodiments.

FIG. 31 is a conceptual block diagram of an FPIC according to exemplary embodiments. For convenience of explanation, a further description of elements and technical aspects previously described may be omitted.

Referring to FIG. 31, the FPIC according to exemplary embodiments may include a second pixel array 121, a plurality of AFEs 210_0 through 210_(m+1), and a plurality of subtractors 220_0 through 220_m.

The second pixel array 121 may include a plurality of pixels P(0,0) through P(n,m+1). Of the pixels P(0,0) through P(n,m+1), one column P(0,m+1) through P(n,m+1) may be a column for outputting noise and may be connected to a noise output line C_noise. Although the column connected to the noise output line C_noise is a last column in FIG. 31, exemplary embodiments are not limited to this case.

Of the AFEs 210_0 through 210_(m+1), AFEs excluding an AFE connected to the noise output line C_noise may all be connected to the subtractors 220_0 through 220_m. Since the AFE connected to the noise output line C_noise among the AFEs 210_0 through 210_(m+1) outputs only noise, the subtractors 220_0 through 220_m may subtract the noise from outputs of the AFEs not connected to the noise output line C_noise among the AFEs 210_0 through 210_(m+1).

Accordingly, the noise common to all pixels may be removed from the outputs. When the second pixel array 121 has (m+2) columns, the number of the subtractors 220_0 through 220_m may be (m+1), which is smaller than (m+2) by one.

Since output signals of the subtractors 220_0 through 220_m are signals from which a noise component common to all pixels has been removed, the output signals may include clearer and more highly reliable fingerprint image data.

Therefore, exemplary embodiments provide an FPIC capable of performing more accurate fingerprint recognition.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A fingerprint recognition device, comprising:
a display which outputs an image;
a touch sensor panel (TSP) which senses a touch on the display; and
a fingerprint recognition integrated circuit (FPIC) which scans a fingerprint touched on the display,
wherein the FPIC comprises:
a pixel comprising a photoelectric element which receives light reflected by the fingerprint;
a low noise amplifier (LNA) which outputs a signal voltage by converting an electric charge received from the photoelectric element; and
an analog-to-digital converter (ADC) which converts the signal voltage into a digital signal,
wherein the ADC comprises:
a variable reference voltage generator which provides a variable reference voltage;
a comparator which adds the variable reference voltage to the signal voltage, performs correlated double sampling on the result of the addition, and outputs a comparison signal by comparing the result of the correlated double sampling with a ramp voltage; and
a counter which outputs the digital signal by counting the comparison signal.

2. The fingerprint recognition device of claim 1, wherein the FPIC comprises a pixel array in which a plurality of pixels, including the pixel, is arranged in rows and columns,
wherein the FPIC initializes outputs of the pixels by performing a dummy capture operation, and subsequently scans the fingerprint by performing a main capture operation.

3. The fingerprint recognition device of claim 2, wherein a first pause exists after the dummy capture operation and before the main capture operation.

4. The fingerprint recognition device of claim 3, wherein the FPIC performs a sub capture operation between the dummy capture operation and the main capture operation.

5. The fingerprint recognition device of claim 3, wherein a second pause is located after the dummy capture operation and before a sub capture operation, the first pause is located after the sub capture operation and before the main capture operation, and the second pause is shorter than the first pause.

6. The fingerprint recognition device of claim 1, wherein the FPIC comprises a pixel array in which a plurality of pixels, including the pixel, is arranged in rows and columns, wherein the pixel array comprises a plurality of output lines, each output line is shared by pixels in the same column, the LNA is one of a plurality of LNAs, and each of the LNAs is connected to any one of the output lines.

7. The fingerprint recognition device of claim 6, wherein a number of the output lines is greater than a number of the LNAs, and the FPIC further comprises a multiplexer which connects the output lines to the LNAs.

8. The fingerprint recognition device of claim 6, wherein the FPIC further comprises a low pass filter (LPF) which removes high-frequency noise of the signal voltage, and the signal voltage from which the high-frequency noise has been removed is transmitted to the ADC.

9. The fingerprint recognition device of claim 8, wherein the LPF is one of a plurality of LPFs, the ADC is one of a plurality of ADCs, each of the ADCs is connected to any one of the LPFs, a number of the LPFs is greater than a number of the ADCs, and the FPIC further comprises a multiplexer which connects the LPFs to the ADCs.

10. The fingerprint recognition device of claim 6, wherein the ADC is one of a plurality of ADCs, and the FPIC further comprises:
a plurality of analog front ends (AFEs) connected to each of the output lines, wherein each of the AFEs comprises one of the LNAs and one of the ADCs and outputs the digital signal; and
a subtractor which outputs a difference between the digital signals of two adjacent AFEs.

11. The fingerprint recognition device of claim 6, wherein the ADC is one of a plurality of ADCs, and the pixel array comprises a noise output column which does not receive a signal and outputs only noise, and
wherein the FPIC further comprises a plurality of analog front ends (AFEs) connected to each of the output lines, each AFE comprising one of the LNAs and one of the ADCs and outputting the digital signal, and a subtractor which subtracts the digital signal of an AFE corresponding to the noise output column from the digital signals of the other AFEs.

12. A fingerprint recognition device, comprising:
a display which outputs an image;
a touch sensor panel (TSP) which senses a touch on the display and generates first touch coordinates;
a display drive integrated circuit (DDI) which illuminates a scan area of the display determined based on the first touch coordinates;
a fingerprint recognition integrated circuit (FPIC) which generates fingerprint image data by scanning a fingerprint in the scan area, outputting a signal voltage by converting an electric charge received from a photoelectric element which receives light reflected by the fingerprint, converting the signal voltage into the fingerprint image data, adding a variable reference voltage to the signal voltage, performing correlated double sampling on the result of the addition, outputting a comparison signal by comparing the result of the correlated double sampling with a ramp voltage, and outputting the fingerprint image data by counting the comparison signal; and
a processor which receives the fingerprint image data.

13. The fingerprint recognition device of claim 12, wherein the scan area is determined when it is identified that there is an intention to perform fingerprint recognition.

14. The fingerprint recognition device of claim 13, wherein the processor identifies whether there is the intention to perform fingerprint recognition and determines the scan area when there is the intention to perform fingerprint recognition.

15. The fingerprint recognition device of claim 13, wherein the TSP identifies whether there is the intention to perform fingerprint recognition and determines the scan area when there is the intention to perform fingerprint recognition.

16. The fingerprint recognition device of claim 13, wherein identifying whether there is the intention to perform fingerprint recognition comprises determining whether a preregistered pattern and a currently recognized pattern are the same.

17. The fingerprint recognition device of claim 13, wherein identifying whether there is the intention to perform fingerprint recognition comprises outputting a guide message when there is no intention to perform fingerprint recognition, and subsequently identifying again whether there is the intention to perform fingerprint recognition.

18. The fingerprint recognition device of claim 13, wherein, when it is identified that there is the intention to perform fingerprint recognition, the scan area is determined using second touch coordinates of a touch made after a reference time measured from the time of identification.

19. The fingerprint recognition device of claim 12, wherein the DDI and the FPIC respectively receive first and second clocks, and the first and second clocks are synchronized with each other.

20. A fingerprint recognition integrated circuit (FPIC), comprising:
a sensor which comprises a pixel array comprising a photoelectric element which receives light reflected by a fingerprint; and
a read-out integrated circuit (IC) which processes an output of the sensor,
wherein the read-out IC comprises a plurality of analog front ends (AFEs) connected to each of output lines respectively corresponding to columns of the pixel array, wherein at least one of the AFEs comprises:
a low noise amplifier (LNA) which outputs a signal voltage by converting an electric charge received through an output line;
a low pass filter (LPF) which removes high-frequency noise of the signal voltage; and
an analog-to-digital converter (ADC) which converts the signal voltage into a digital signal,
wherein the ADC comprises:
a variable reference voltage generator which provides a variable reference voltage;
a comparator which adds the variable reference voltage to the signal voltage, performs correlated double sampling on the result of the addition, and outputs a comparison signal by comparing the result of the correlated double sampling with a ramp voltage; and
a counter which outputs the digital signal by counting the comparison signal.

* * * * *